United States Patent
Jones et al.

(10) Patent No.: US 10,962,962 B2
(45) Date of Patent: Mar. 30, 2021

(54) QUICK CONNECTION TECHNIQUES FOR SKID COMMUNICATOR TOOL

(71) Applicant: FISHER-ROSEMOUNT SYSTEMS, INC., Round Rock, TX (US)

(72) Inventors: Aaron C. Jones, Round Rock, TX (US); Michael G. Ott, Round Rock, TX (US); Julian K. Naidoo, Cedar Park, TX (US); Deborah R. Colclazier, Red Lodge, MT (US); Karen Johnson, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 2 days.

(21) Appl. No.: 16/416,468

(22) Filed: May 20, 2019

(65) Prior Publication Data
US 2020/0371502 A1 Nov. 26, 2020

(51) Int. Cl.
*G05B 19/418* (2006.01)
*G05B 19/05* (2006.01)
(Continued)

(52) U.S. Cl.
CPC ....... *G05B 19/4185* (2013.01); *G05B 19/052* (2013.01); *G05B 19/056* (2013.01);
(Continued)

(58) Field of Classification Search
CPC .............. G05B 19/4185; G05B 19/056; G05B 19/058; G05B 19/052; G06F 9/542; G06F 9/451
See application file for complete search history.

(56) References Cited

U.S. PATENT DOCUMENTS

| 4,517,637 A | 5/1985 | Cassell |
| 6,973,508 B2 | 12/2005 | Shepard et al. |

(Continued)

FOREIGN PATENT DOCUMENTS

| DE | 10 2010 040 054 A1 | 3/2012 |
| EP | 3 196 716 A1 | 7/2017 |

(Continued)

OTHER PUBLICATIONS

Siemens, Industry Online Support, "how the PLC and HMI communicates!?", Retrieved from the Internet at <https://support.industry.siemens.com/tf/WW/en/posts/how-the-plc-and-hmi-communicates/87700?page=0&pageSize=10> Aug. 13, 2019.

(Continued)

*Primary Examiner* — Ziaul Karim
(74) *Attorney, Agent, or Firm* — Marshall, Gerstein & Borun LLP

(57) ABSTRACT

The described techniques enable a skid communicator tool to quickly change network settings to those required by a particular skid or network in a process control environment with which a user of the tool wishes to establish communication. These techniques are helpful because skids and networks in process control environments often require different network settings for any device attempting to communicate with the skids or network, and a user often must manually load these network settings every time she wants to communicate with a different network or skid. By contrast, the techniques enable the skid communicator tool to seamlessly connect to, disconnect from, and reconnect to any of the skids or other networks requiring different network settings with minimal input from the user, thus enabling a user to easily move through and interact with different areas, units, or equipment of the process control environment.

28 Claims, 6 Drawing Sheets

(51) Int. Cl.
G06F 9/451 (2018.01)
G06F 9/54 (2006.01)
(52) U.S. Cl.
CPC .......... G05B 19/058 (2013.01); G06F 9/451 (2018.02); G06F 9/542 (2013.01)

(56) References Cited

U.S. PATENT DOCUMENTS

| | | | |
|---|---|---|---|
| 2002/0080938 A1* | 6/2002 | Alexander, III | H04M 11/002 379/106.01 |
| 2002/0111948 A1* | 8/2002 | Nixon | G05B 19/4185 |
| 2008/0081579 A1 | 4/2008 | Chen et al. | |
| 2008/0140870 A1 | 6/2008 | Meyer et al. | |
| 2011/0301725 A1 | 12/2011 | Kline, Jr. | |
| 2012/0029661 A1 | 2/2012 | Jones et al. | |
| 2012/0254339 A1* | 10/2012 | Holmes | H04L 41/08 709/212 |
| 2012/0296448 A1 | 11/2012 | Balentine et al. | |
| 2015/0039786 A1* | 2/2015 | Martin | G06F 13/423 710/8 |
| 2015/0113662 A1 | 4/2015 | Muller | |
| 2015/0261717 A1* | 9/2015 | Greiner-Jacob | G06F 13/4265 710/109 |
| 2015/0338837 A1 | 11/2015 | Wagener et al. | |
| 2016/0076664 A1* | 3/2016 | Erni | F16K 37/0075 700/282 |
| 2016/0320762 A1 | 11/2016 | Lutz et al. | |
| 2016/0337863 A1* | 11/2016 | Robinson | H04W 4/021 |
| 2016/0359866 A1 | 12/2016 | Mixer | |
| 2018/0052683 A1 | 2/2018 | Iguchi | |
| 2018/0109955 A1* | 4/2018 | Nixon | H04L 67/34 |
| 2018/0113430 A1* | 4/2018 | Naidoo | G05B 19/05 |
| 2019/0079507 A1 | 3/2019 | Jones et al. | |

FOREIGN PATENT DOCUMENTS

| | | | |
|---|---|---|---|
| GB | 2 420 423 A | | 5/2006 |
| JP | 2008-282362 A | | 11/2008 |
| WO | WO-2016/151856 A1 | | 9/2016 |

OTHER PUBLICATIONS

Wikipedia, "Modular process skid", Retrieved from the Internet at <https://en.wkipedia.org/wiki/Modular_process_skid> Aug. 13, 2019.

ISA, "Programmable logic controllers: Hardware, software architecture", Retrieved from the Internet at <https://www.isa.org/standards-publications/isa-publications/intech-magazine/2010/december/automation-basics-programmable-logic-controllers-hardware-software-architecture/> Sep. 12, 2017.

Automation.com, "Profibus and Modbus: a comparison", Retrieved from the Internet at <https://www.automation.com/automation-news/article/profibus-and-modbus-a-comparison> Aug. 13, 2019.

RTA Real Time Automation, "Modbus TCP/IP Unplugged—An introduction to Modbus TCP/IP Addressing, Function Codes and Modbus TCP/IP Networking", Retrieved from the Internet at <https://www.rtautomation.com/technologies/modbus-tcpip/> Aug. 13, 2019.

OpenPLC, "OpenPLC and Modbus Slaves", Retrieved from the Internet at <https://www.openplcproject.com/getting-started-modbus-io? Aug. 13, 2019.

Search Report for Application No. GB1717423.6, dated Apr. 19, 2018.

Search Report for Application No. GB1814880.9, dated Mar. 8, 2019.

Search Report for Application No. GB2006281.6, dated Jan. 15, 2021.

* cited by examiner

QUICK CONNECTION TECHNIQUES FOR SKID COMMUNICATOR TOOL

TECHNICAL FIELD

The present disclosure generally relates to skids found in process control environments, and more particularly, to a skid communicator tool that can quickly establish communication with the skids.

BACKGROUND

Process control systems, such as distributed or scalable process control systems like those used in power generation, chemical, petroleum, or other processes, typically include one or more controllers communicatively coupled to each other, to at least one host or operator workstation via a process control network, and to one or more field devices via analog, digital or combined analog/digital buses. The field devices, which may be valves, valve positioners, switches, and transmitters (e.g., temperature, pressure and flow rate sensors), perform functions within the process or plant such as opening or closing valves, switching devices on and off and measuring process parameters. The controller receives signals indicative of process or plant measurements made by the field devices (or other information pertaining to the field devices), uses this information to implement a control routine, and then generates control signals which are sent over the buses to the field devices to control the operation of the process or plant. Information from the field devices and the controller is typically made available to one or more applications executed by the operator workstation to enable an operator to perform any desired function with respect to the process or plant, such as viewing the current state of the plant, modifying the operation of the plant, etc.

The process controllers, which are typically located within the process plant environment, receive signals indicative of process measurements or process variables made by or associated with the field devices (or other information pertaining to the field devices) and execute controller applications. The controller applications implement control modules that make process control decisions, generate control signals based on the received information, and coordinate with the control modules or blocks in the field devices such as HART® and Fieldbus field devices. The control modules in the process controllers send the control signals over the communication lines or signal paths to the field devices, to thereby control the operation of the process.

Information from the field devices and the process controllers is typically made available via the process control network to one or more other hardware devices, such as operator workstations, maintenance workstations, personal computers, handheld devices, data historians, report generators, centralized databases, etc. The information communicated over the network enables an operator or a maintenance person to perform desired functions with respect to the process. For example, the information allows an operator to change settings of the process control routine, modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc.

The field devices usually communicate with the hardware devices over the process control network, which may be an Ethernet-configured LAN. The network relays the process parameters, network information, and other process control data through various network devices and to various entities in the process control system. The network devices typically facilitate the flow of data through the network by controlling its routing, frame rate, timeout, and other network parameters, but generally do not change the process data itself.

Some process plants include modular process skids ("skids") that may be integrated into the process control system to varying degrees. A skid may be thought of as a "system in a box" that acts as a self-contained process or sub-process. Each skid generally includes a controller such as a programmable logic controller ("PLC"). The PLC generally includes one or more processors, one or more memory or storage components, and specialized input/output (I/O) modules. Note, some important characteristics distinguish a PLC from a general-purpose computer. Most importantly, a PLC is typically more reliable, designed for a mean time between failures measured in years. Second, a PLC can be placed in an industrial environment with its substantial amount of electrical noise, vibration, extreme temperatures, and humidity. Third, PLCs are easily maintained by plant technicians.

SUMMARY

The described methods and systems enable a skid communicator tool to quickly change network settings to those required by a particular skid or network in a process control environment with which a user of the tool wishes to establish communication. These methods and systems are helpful because skids and networks in process control environments often require different network settings for any device attempting to communicate with the skids or network, and a user must often manually load these network settings every time she wants to communicate with a different network or skid. By contrast, the described methods and systems enable the skid communicator tool to seamlessly connect to, disconnect from, and reconnect to any of the skids or other networks requiring different network settings with minimal input from the user, thus enabling a user to easily move through and interact with different areas, units, or equipment of the process control environment.

In an embodiment, a skid communicator tool for communicating with skid controllers in process control environments includes any one or more of: a communication interface, one or more processors, a memory, or a user interface component (e.g., including a display or input sensors, such as those associated with a touchscreen or with an electromechanical input component such as a mouse, a keyboard, or any other type of button.) The skid communicator tool may be configured to do any one or more of the following: (i) detect a link (which may be wired) between the communication interface and a skid controller for a skid in a process control environment; (ii) detect that the set of initial network settings does not enable a communication channel between the skid communicator tool and the skid controller by way of the link; (iii) perform an analysis of a plurality of sets of preconfigured network settings to identify a particular set of preconfigured network settings associated with the skid controller; and (iv) when the particular set of preconfigured network settings is identified by way of the analysis: (a) automatically configure the communication interface according to the particular set of reconfigured network settings to establish the communication channel via the link; and (b) control, monitor, or configure operation of the skid by transmitting or receiving skid data via the communication channel.

In an embodiment, a method for quickly connecting to skid controllers and downloading skid configurations may include any one or more of the following: detecting, by a skid communicator tool, a link (which may be wired) between the skid communicator tool and a skid controller for a skid in a process control environment; detecting, by the skid communicator tool, that a set of initial network settings according to which the skid communicator tool is configured does not enable a communication channel between the skid communicator tool and the skid controller by way of the link; analyzing a plurality of sets of preconfigured network settings to identify a particular set of preconfigured network settings associated with the skid controller; and when the particular set of preconfigured network settings is identified by way of the analyzing: (a) automatically configuring, by the skid communicator tool, the skid communicator tool according to the particular set of preconfigured network settings to enable the skid communicator tool to establish the communication channel via the link; and (b) controlling, monitoring, or configuring operation of the skid by transmitting or receiving skid data via the communication channel.

Note, this summary has been provided to introduce a selection of concepts further described below in the detailed description. As explained in the detailed description, certain embodiments may include features and advantages not described in this summary, and certain embodiments may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

Figure 1A:
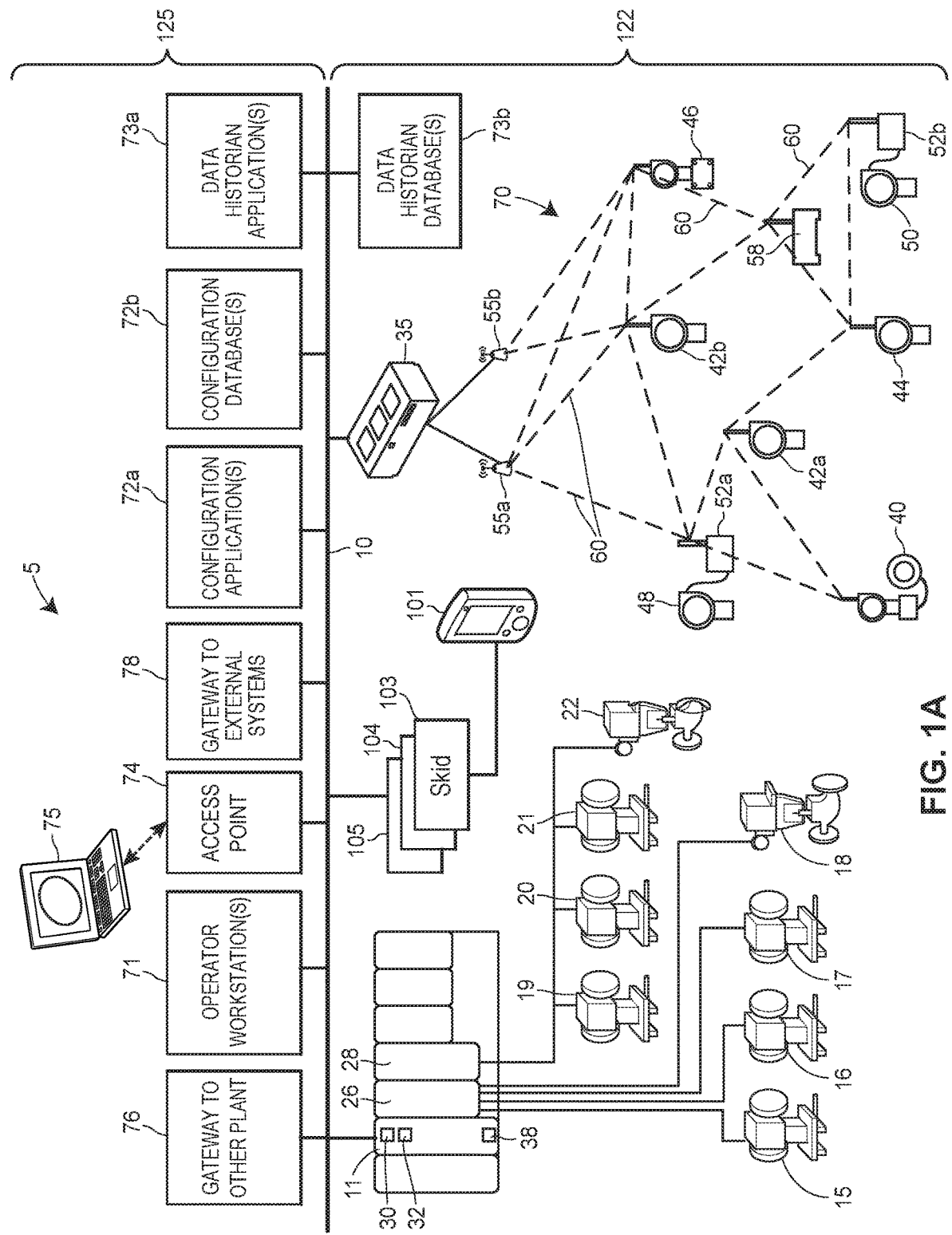
FIG. 1A is a block diagram of an example process control environment including a set of skids and a skid communicator tool for communicating with and configuring the skids.

A process plant, process control system, or process control environment that operates to control one or more industrial processes in real-time may include one or more skids each representing modular, self-contained control systems that control a particular process or sub-process within the broader plant environment and that are controlled in a manner distinct from the manner in which more typical field devices and other process control devices are controlled.

A portable skid communication tool may perform monitoring, control, or configuration operations on the skids. Each of the skids may require different network settings for any device attempting to communicate with the skid and thus may require a tedious reconfiguration process every time a user wishes to transition between the skids. Utilizing one or more of the skid communication techniques, systems, apparatuses, components, devices, or methods described herein, a skid communication tool enables quick and seamless reconfiguration of the tool, allowing a user to easily transition between skids.

Specifically, the portable skid communication tool enables quick and seamless reconfiguration of network settings, enabling the tool to quickly connect, disconnect, and reconnect to skid controllers implementing restrictive access control policies. Note, skid controllers often implement restrictive access control policies. For security reasons, skid controllers often require that any device connecting to the skid controller have a particular static IP address, or have one of a small number of particular static IP addresses. As a result, when an operator or technician in the field wishes to establish communication between her device and the skid controller, she generally needs to first manually configure the device so that it has the particular IP address required by the skid controller (e.g., as opposed to enabling the device to dynamically be assigned an IP address, which is unlikely to result in the device being assigned the proper IP address). This restrictive access control policy helps prevent unknown, unauthorized, and potentially hostile parties from establishing connection to the skid, thus preventing such entities from purposefully or negligently interfering with normal operation of the process or sub-process controlled by the skid, and preventing potential delays, lost revenue, and dangerous mechanical failures resulting from such interference. Unfortunately, these restrictive access control policies also often force manual reconfiguration of a device by a technician any time she wants to communicate with the skid controller, which is inefficient and interruptive to the technician's workflow. The portable skid communication tool described herein allows a user to avoid this manual reconfiguration process.

As for the plant environment, the process plant, when commissioned and operating on-line, includes one or more wired or wireless process control devices, components, or elements that perform physical functions in concert with a process control system to control one or more processes executing within the process plant. The process plant or process control system may include, for example, one or more wired communication networks and/one or more wireless communication networks. Additionally, the process plant or control system may include centralized databases, such as continuous, batch, asset management, historian, and other types of databases.

Below, the description is organized into sections describing the following: (I) an example plant environment in which one or more skids and a skid communicator tool may be found, referencing FIG. 1A; (II) an example skid and skid communicator tool, referencing FIGS. 1B and 2; (III) example operations that may be implemented by a skid communicator tool, referencing the flowchart shown in FIG. 3 and the example displays shown in FIGS. 4 and 5; and (IV) additional considerations.

An Example Plant Environment 5

FIG. 1A is a block diagram of an example process plant, process control system, or process control environment 5, including a set of skids 103-105 and a skid communicator tool 101 for communicating with and configuring the skids 103-105. Each of the skids 103-105 requires different network settings for any device attempting to communicate with the skids 103-105. The tool 101 includes a skid client enabling the tool 101 to quickly change network settings to those required by the particular skid with which a user of the tool 101 wishes to establish communication. Consequently, while a user moves through and interacts with different areas, units, or equipment within the plant 5, the tool 101 can seamlessly connect to, disconnect from, and reconnect to any of the skids or other networks requiring different network settings.

The process plant 5 controls a process that may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). The process plant or control system 5 of FIG. 1A includes a field environment 122 (e.g., "the process plant floor 122") and a back-end environment 125, each of which are communicatively connected by a process control backbone or data highway 10, which may include one or more wired or wireless communication links, and may be implemented using any desired or suitable communication protocol, such as an Ethernet protocol.

At a high level (and as shown in FIG. 1A), the field environment 122 includes physical components (e.g., process control devices, networks, network elements, etc.) that are disposed, installed, and interconnected to operate to control the process during run-time. For example, the field environment 122 includes an I/O network 6. By and large, the components of the I/O network 6 are located, disposed, or otherwise included in the field environment 122 of the process plant 5. Generally speaking, in the field environment 122 of the process plant 5, raw materials are received and processed using the physical components disposed therein to generate one or more products.

By contrast, the back-end environment 125 of the process plant 5 includes various components such as computing devices, operator workstations, databases or databanks, etc. that are shielded or protected from the harsh conditions and materials of the field environment 122. In some configurations, various computing devices, databases, and other components and equipment included in the back-end environment 125 of the process plant 5 may be physically located at different physical locations, some of which may be local to the process plant 5, and some of which may be remote.

The Field Environment 122 of the Plant 5

As noted, the field environment 122 includes one or more I/O networks, each of which includes: (i) one or more controllers, (ii) one or more field devices communicatively connected to the one or more controllers, and (iii) one or more intermediary nodes (e.g., I/O cards) facilitating communication between the controllers and the field devices.

Generally, at least one field device performs a physical function (e.g., opening or closing a valve, increasing or decreasing a temperature, taking a measurement, sensing a condition, etc.) to control the operation of a process implemented in the process plant 5. Some types of field devices communicate with controllers via I/O devices (sometimes called "I/O cards"). Process controllers, field devices, and I/O cards may be configured for wired or wireless communication. Any number and combination of wired and wireless process controllers, field devices, and I/O devices may be included in the process plant environment or system 5.

For example, the field environment 122 includes the I/O network 6, which includes a process controller 11 communicatively connected, via an I/O card 26 and an I/O card 28, to a set of wired field devices 15-22. The field environment 122 also includes a wireless network 70 including a set of wireless field devices 40-46 coupled to the controller 11 (e.g., via a wireless gateway 35 and the network 10). The wireless network 70 may be a part of the I/O network 6, or may be a part of an I/O network not shown in FIG. 1A (and may include controllers or I/O cards not shown in FIG. 1A).

In some configurations (not shown), the controller 11 may be communicatively connected to the wireless gateway 35 using one or more communications networks other than the backbone 10. Such networks may include any number of nodes and wired or wireless communication links that support one or more communication protocols such as HART®, WirelessHART®, Profibus, FOUNDATION® Fieldbus, or any one or more of the communication protocols, standards, or technologies identified in the Additional Considerations section.

The Process Controller 11

The controller 11, which may be, by way of example, the DeltaV™ controller sold by Emerson Process Management, may operate to implement a batch process or a continuous process using at least some of the field devices 15-22 and 40-46. In addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, or any smart communication protocol such as the FOUNDATION® Fieldbus protocol, the HART® protocol, the WirelessHART® protocol, etc. In FIG. 1A, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols.

The process controller 11 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. Note, any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object-oriented programming, ladder logic, sequential function charts, function block diagrams, or using any other software programming language or design paradigm. The control routines 38 may be stored in any desired type of memory 32, such as random-access memory (RAM), or read only memory (ROM). Likewise, the control routines 38 may be hard-coded into, for example, one or more EPROMs, EEPROMs, application specific integrated circuits (ASICs), or any other hardware or firmware elements. Put simply, the controller 11 may be configured to implement a control strategy or control routine in any desired manner.

The controller 11 implements a control strategy using what are commonly referred to as function blocks, where each function block is an object or other part (e.g., a subroutine) of an overall control routine. The controller 11 may operate in conjunction with function blocks implemented by other devices (e.g., other controllers or field devices) to implement process control loops within the process control system 5. Control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control system 5 (sometimes referred to as "output blocks"). Of course, hybrid and other types of function blocks exist.

Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 38 may implement one or more control loops which are performed by executing one or more of the function blocks.

The Wired Field Device 15-22 and I/O Cards 26 and 28

The wired field devices 15-22 may be any types of devices, such as sensors, valves, transmitters, positioners, etc., while the I/O cards 26 and 28 may be any types of process control I/O devices conforming to any desired communication or controller protocol. In FIG. 1A, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. Additionally or alternatively, in some embodiments at least some of the wired field devices 15-22 or at least some of the I/O cards 26, 28 communicate with the controller 11 using the process control data highway 10 or by using other suitable control system protocols (e.g., Profibus, DeviceNet, Foundation Fieldbus, ControlNet, Modbus, HART, etc.).

The Wireless Field Devices 40-46

In FIG. 1A, the wireless field devices 40-46 communicate via the wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, or other nodes or devices of the process control plant 5. For example, the wireless gateway 35 may provide communicative coupling by using the process control data highway 10 or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1A, a field device 48 of FIG. 1A is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1A, the wireless devices 40-46 and 52-58 communicate with each other and with the wireless gateway 35 over wireless links 60 of the wireless communications network 70, or via the process control data highway 10.

The Back-End Environment 125 of the Plant 5

As noted, the back-end environment 125 includes various components such as computing devices, operator workstations, databases or databanks, etc. that are typically shielded or protected from the harsh conditions and materials of the field environment 122. The back-end environment 125 may include any one or more of the following, each of which may be communicatively connected to the data highway 10: (i) one or more operator workstation(s) 71; (ii) a configuration application 72a and a configuration database 72b; (iii) a data historian application 73a and a data historian database 73b; (iv) one or more other wireless access points 74 that communicate with other devices using other wireless protocols; and (v) one or more gateways 76, 78 to systems external to the immediate process control system 5.

The Operator Workstation 71

Users (e.g., operators) may utilize the operator workstation 71 to view and monitor run-time operations of the process plant 5, as well as take any diagnostic, corrective, maintenance, or other actions that may be required. At least some of the operator workstations 71 may be located at various, protected areas in or near the plant 5, and in some situations, at least some of the operator workstations 71 may be remotely located, but nonetheless in communicative connection with the plant 5.

Operator workstations 71 may be wired or wireless computing devices, and may be dedicated or multi-purpose devices. For example, in some embodiments, a set of applications, routines, or specially configured circuits (e.g., ASICs) that enable the functionality provided by the workstations 71 may be implemented by any suitably configured computing device or set of computing devices capable of accessing the network 10 (e.g., a desktop computer, a laptop, a mobile device such as a phone or tablet, a client/server(s) system, etc.), and may include a user interface with UI input components or UI output components, such as those identified in the Additional Considerations section, enabling the user of the workstation 71 to monitor run-time parameters, change run-time parameters, or perform or monitor diagnostic, corrective, or maintenance operations.

The Configuration Applications 72a and Database 72b

The configuration application 72a and the configuration database 72b (collectively the "configuration system 72") may be utilized to configure certain aspects of the plant 5. Various instances of the configuration application 72a may execute on one or more computing devices (not shown) to enable users to create or change process control modules and download these modules via the data highway 10 to the controllers 11, as well as to enable users to create or change operator interfaces via which in operator is able to view data and change data settings within process control routines (e.g., the interfaces provided by the workstation(s) 71).

Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5). Each instance of the configuration application 72a may be implemented on any suitable computing device or set of computing devices (e.g., a desktop computer or workstation, a laptop, a mobile device such as a phone or tablet, a client/server(s) system, etc.), which may include a user interface with UI input components or UI output components such as those identified in the Additional Considerations section.

In operation, the configuration database 72b stores the process modules or user interfaces that have been created or otherwise configured by the user of the application 72a. The configuration application 72a and configuration database 72b may be centralized and may have a unitary logical appearance to the process control system 5, although multiple instances of the configuration application 72a may execute simultaneously within the process control system 5. Further, the configuration database 72b may be implemented across multiple physical data storage devices. Accordingly, the configuration application 72a, the configuration database 72b, and the user interfaces thereto (not shown) comprise a configuration or development system 72 for control or display modules.

In addition to enabling the configuration of process modules and user interface, the configuration system 72 enables the creation, assignment, and storage of logical identifiers of components and signals in the plant 5 (e.g., the field devices 15-22 and 40-46, as well as corresponding signals sent or received by the field devices 15-22 and 40-46). The logical identifiers may be referenced by the control modules and devices implemented in the plant 5 to interact with the components (and associated signals) assigned to the logical identifiers. For example, one or more devices in the plant may each have an assigned "device tag" or "DT." Further, one or more signals transmitted or received by devices in the plant may each have an assigned "signal tag," which is sometimes called a "device signal tag" or "DST." In some instances, DSTs only need be implemented for devices that transmit or receive more than a single signal. Collectively, the DTs and DSTs may simply be referred to as "tags," "system tags," or "system identifiers." In many instances, the logical identifiers have an associated value or set of values, each of which represents a particular variable value (e.g., measurement) or command. Generally speaking, the tags may be used by the process plant 5 in both the field environment 122 and in the back-end environment 125 to uniquely identify an associated device or signal. For example, control routines can reference the tags and associated values to implement control of the plant.

To illustrate, for a given field device, the configuration database 72b may store information mapping or binding a logical identifier or tag to a particular hardware address or I/O channel. The hardware address may identify a particular controller, a particular I/O card connected to the particular controller, or a particular address for the I/O channel connecting the particular I/O card to the field device. For example, the configuration database 72b may store bindings that map tags to I/O channels of the I/O device 28 coupled to the field devices 19-22, enabling the devices in the plant 5 to reference signals transmitted and received by each of the field devices 19-22. In some instances, this mapping or binding may be stored at the controller 11, the user interface device 75, the operator workstation 71, or any other desired device (e.g., any device needing to resolve the logical identifier). After a tag has been bound to a hardware address or I/O channel, the tag is considered "assigned."

Figure 3:
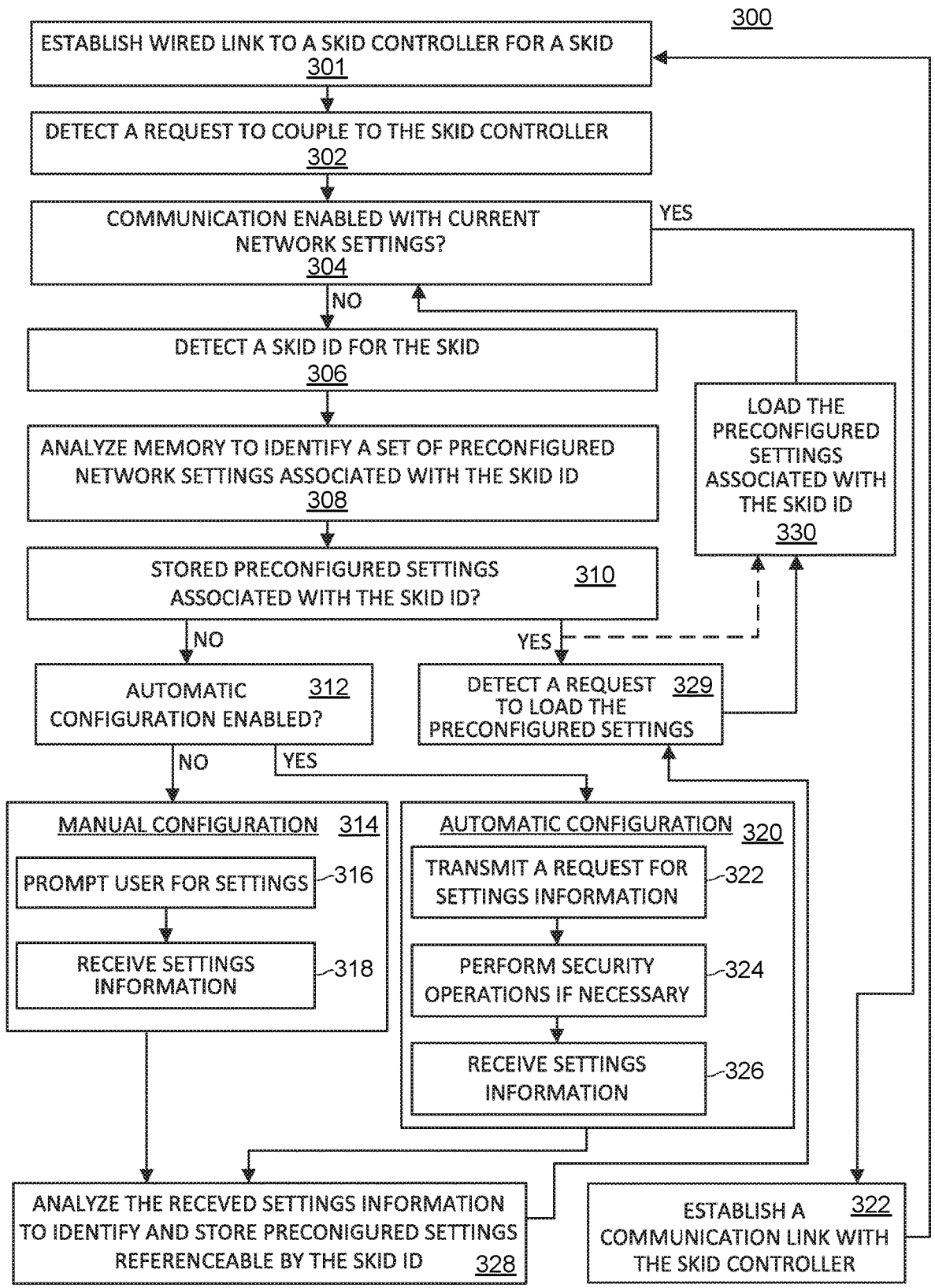
FIG. 3 is a flow chart of an example method for quickly configuring the skid communicator tool, shown in FIGS. 1A and 2, according to a set of preconfigured network settings conforming to a set of whitelisted settings maintained by the skid controller shown in FIG. 2, enabling the skid communicator tool to fully communicate with the skid controller.

As a second example, the configuration database 72b may store a tag for the skid 103 (e.g., "SK103"). Other devices may reference the skid 103 via the tag to communicate with the skid 103 (though, in some instances, the other devices may not be able to directly access, control, or communicate with the actuators, sensors, and other skid components of the skid 103). The skid tag may be mapped to a hardware address or network address associated with a supervisory system that connects the skid 103 to the network 10, as shown in FIG. 3.

The Data Historian 73a and Database 73b

The data historian application 73a collects some or all of the data provided across the data highway 10, and historizes or stores the collected data in the historian database 73b for long term storage. The data historian application 73a and historian database 73b may be centralized and may have a unitary logical appearance to the process control system 5 (e.g., they may appear to be a single application or application suite), although multiple instances of a data historian application 73a may execute simultaneously within the process control system 5, and the data historian 73b may be implemented across multiple physical data storage devices. Each instance of the data historian application 73a may be implemented on any suitable computing device or set of computing devices (e.g., a desktop computer or workstation, a laptop, a mobile device such as a phone or tablet, a client/server(s) system, etc.), which may include a user interface with UI input components or UI output components such as those identified in the Additional Considerations section.

The Wireless Access Points 74

The one or more other wireless access points 74 enable devices in the back-end environment 125 (and sometimes in the field environment 122) to communicate with other devices using any suitable wireless communicational protocols, such as Wi-Fi or any of the other wireless communication protocols or standards identified in the Additional Considerations section.

Typically, the wireless access points 74 allow handheld or other portable computing devices (e.g., user interface devices 75) to communicate over a wireless process control communication network that is connected to the network 10 or that is a subnetwork of the network 10. This wireless network may be different than the wireless network 70, and may support a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58) also communicate using the wireless protocol supported by the access points 74.

The Gateways 76 and 78

The gateways 76 and 78 may interface with systems that are external to the immediate process control system 5. Typically, such systems are customers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 1A only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

The Skid 103 and the Skid Communicator Tool 101

Figure 1B:
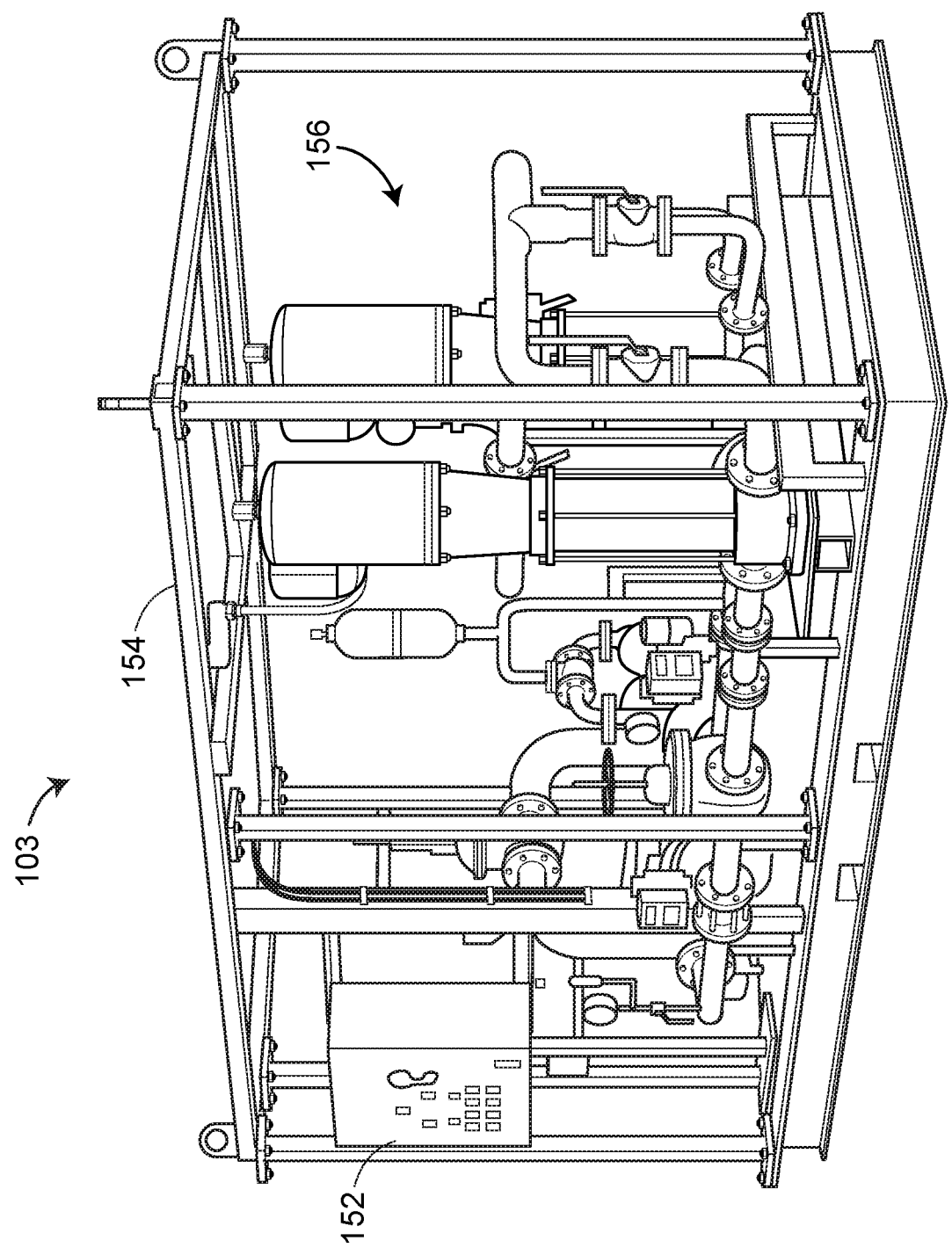
FIG. 1B is a perspective view of one of the skids shown in FIG. 1A.

FIG. 1B is a perspective view of the skid 103 (also shown in FIG. 1A). The skid 103 is a modular, self-contained, and autonomous or semi-autonomous control system (relative to the larger control system implemented at the plant 5). Example skids include bottle filling skids, cleaner skids, labeler skids, imprinter skids, cartoner skids, capper skids, wrapper skids, centrifugre skids, compressor skids, clean-in-place skids, etc.

The skid 103 includes a control cabinet 152, a frame 154, and a set of skid components 156. The control cabinet 152 may include a controller (e.g., a PLC) configured to monitor and control the skid components 156, which may include sensors (e.g., for measuring temperatures, flows, pressures, fluid levels, etc.), actuators, and piping for material flow.

Figure 2:
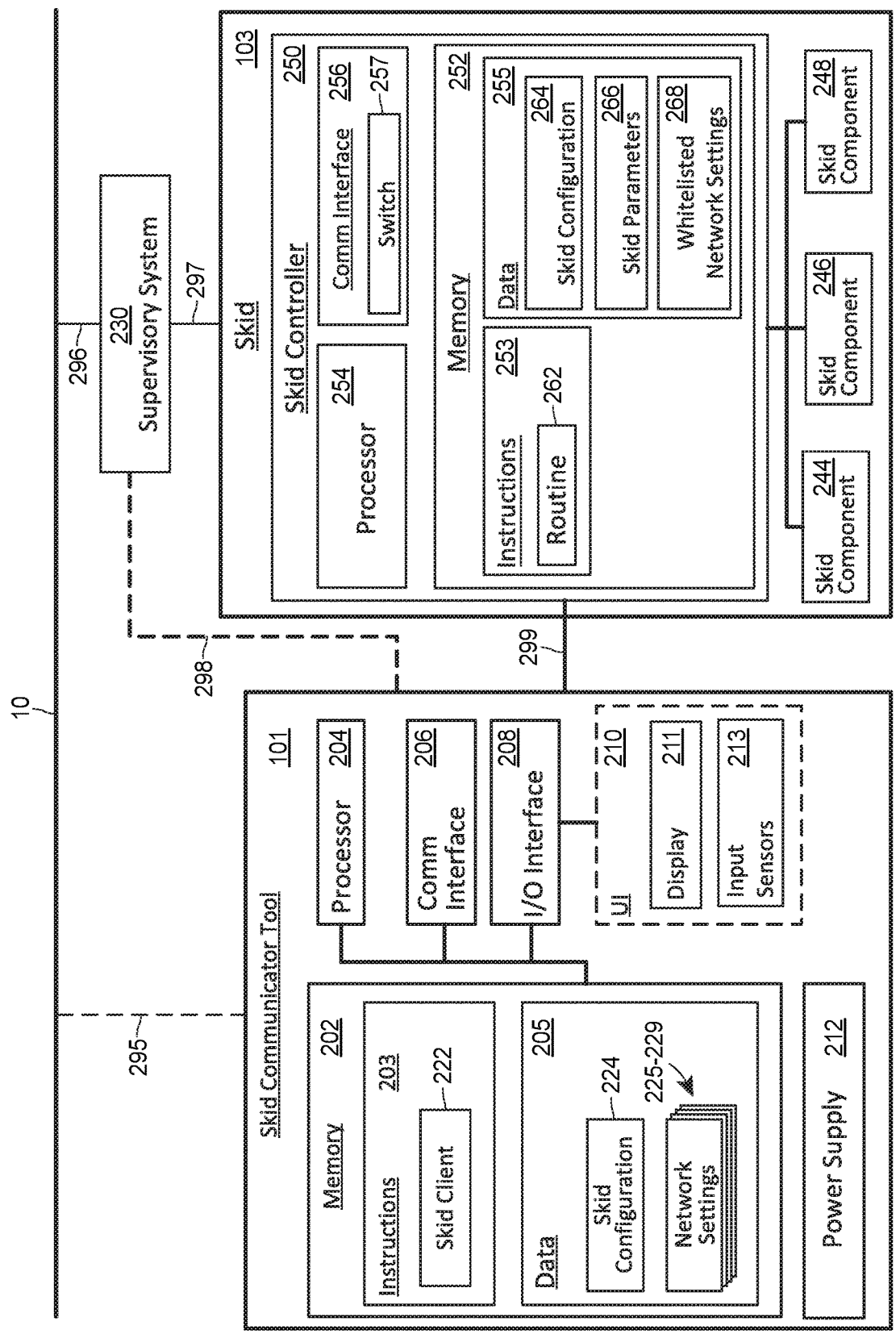
FIG. 2 is a block diagram of the skid shown in FIG. 1B and of the skid communicator tool shown in FIG. 1A.

FIG. 2 is a block diagram of the skid 103 and the skid communicator tool 101 (also shown in FIG. 1A). The tool 101 includes a skid client 222 that enables the tool 101 to quickly and automatically change network settings to those required by each of the skids 103-105 or the network 10, thus enabling an operator of the tool 101 to quickly and easily move between and communicate with the skids 103-105 and the network 10 without requiring her to spend significant time manually updating network settings.

Regarding the communication links shown in FIG. 2, the tool 101 may be coupled to the skid 103 via a wired link 299, may be coupled to the network 10 via a wired or wireless link 295, or may be coupled to a supervisory system 230 via a wired or wireless link 298. While the link 299 may be wireless in some instances, it may be desirable for the link 299 to be wired for security reasons. In some instances, the link 299 includes one or more intermediary nodes and sub-links. For example, the tool 101 and the skid 103 may be coupled via a networking device in the plant 5, such as a router, a hub, or a switch. As indicated by the dashed lines for the links 295 and 298, in some instances the tool 101 may not be coupled to the network 10 or to the supervisor 230.

Regarding communication links to the skid 103, the skid 103 may communicate with the supervisory system 230 or the network 10 via a wired or wireless link 297, and the supervisory system 230 may be coupled to the network 10 via a wired or wireless link 296. If desired, the skid 103 may be coupled to the network 10 via a direct link (not shown). The description below elaborates on the components and functionalities of the skid 103, the tool 101, and the supervisory system 230.

The Skid 103

The skid 103 is a modular process control system contained within a frame that enables the contained system to easily be transported, and may be considered a self-contained "system within a box." The owners or operators of the plant 5 may purchase the skid 103 to avoid the time and effort that goes into designing a corresponding system from the ground up.

The skid 103 includes a set of skid components 244-248 (e.g., corresponding to the components 156 shown in FIG. 1B) and a controller 250 (e.g., located in the cabinet 152 shown in FIG. 1B) that controls the components 244-248. Each of the components 244-248 may be any suitable process instrumentation or field device, such as a valve, a pump, a temperature/pressure/level/flow sensor or indicator, etc. In fact, each component 244-248 may be similar or identical to one or more of the field devices 15-22 and 40-46 shown in FIG. 1A.

The controller 250 of the skid 103 includes a processor 254 communicatively connected to a memory 252 and a communication interface 256, which enables the controller 250 to: (i) connect to the network 10 and communicate with one or more nodes of the network 10, (ii) communicate with the tool 101, (iii) communicate with the supervisory system 230, or (iv) communicate with or control any one or more of the skid components 244-248.

The communication interface 256 may include any number and combination of wired and wireless interfaces. For example, the tool 101, the supervisory system 230, and the skid components 244-256 may all connect to the controller 250 via a single wireless card or adapter; alternatively, each may connect to the controller 250 via different wired or wireless connections, ports, or adapters. As shown in FIG. 2, the controller 250 may include an integrated switch 257 as part of the communication interface 256, and may include one or more externally facing ports (e.g., to which the tool 101 may connect) and one or more internally facing ports or connection points (e.g., connecting the controller 250 to the devices connected to the switch 257). Accordingly, the communication interface 256 may implement a number of a features typically associated with switches, such as: enabling or disabling ports (e.g., for a port to which the tool 101 is connected); adjusting link bandwidth and duplex settings; configuring and monitoring quality of service (QoS); hardware address (e.g., MAC) filtering and other access control list features, such as those associated with the IEEE 802.1X standard; configuring Spanning Tree Protocol (STP) and Shortest Path Bridging (SPB) features; Simple Network Management Protocol (SNMP) monitoring of device and link health; port mirroring for monitoring traffic and troubleshooting; link aggregation configuration to set up multiple ports for the same connection to achieve higher data transfer rates and reliability; or network traffic snooping. In some embodiments, the switch 257 may be external to the controller 250. That is, it may be a component of the skid 103, and may couple the communication interface 256 of the controller 250 to other devices connected to the switch 257 (e.g., the tool 101).

The memory 252 stores instructions 253 including a set of routines 262 for controlling the components 244-248 and data 255 including a skid configuration 264, a set of skid parameters 266, and a set of whitelisted network settings 268. In operation, the controller 250 implements a control strategy defined by one or more control routines in the set of routines 262. When the processor 254 executes one or more of the control routines, the controller 250 transmits to a skid component 244-248 a control signal (i.e., a "control output") over wired or wireless communication links or networks to control operation of a process or sub-process controlled by the skid 103. The controller 250 may generate a control signal based on: (i) one or more received signals, which may be referred to as "control inputs" (e.g., one or more received signals representing measurements obtained by one of the skid components 244-248), and (ii) the logic of the one or more control routines, which may be defined by one or more software elements (e.g., function blocks). Typically, the controller 250 manipulates a process input (which may be referred to as a "manipulated variable") to change a particular process output (which may be referred to as a "controlled variable") based on feedback (i.e., a measurement of the controlled variable) and a desired value for the process output (i.e., a setpoint).

The Routine(s) 262

The routines 262 may take any form, including software, firmware, or hardware. The routines 262 may be stored in any desired type of memory 252, such as RAM or ROM. Likewise, the routines 262 may be hard-coded into, for example, one or more EPROMs, EEPROMs, application specific integrated circuits (ASICs), or any other hardware or firmware elements. The routines 262 may include control routines, communication routines, security routines, or any other desired routine that may be utilized to facilitate operation of the skid 103.

As a first example, the routines 262 may include control routines or instructions implemented by the processor 254 to monitor or control the skid components 244-248. The control routines may be implemented in any desired software format, such as using object-oriented programming, ladder logic, sequential function charts, function block diagrams, or using any other software programming language or design paradigm. The control routines may include one or more programs, each of which generally consists of an interconnection of function blocks that may be written in any of the IEC languages. The control routines may contain declarations of physical inputs/outputs and variables.

As a second example, the routines 262 may include communication routines or instructions to facilitate establishing communication between the controller 250 and the tool 101 sufficient to enable the tool 101 to implement operations associated with the skid client 222 for controlling, monitoring, and configuring the controller 250.

As a third example, the routines 262 may include security routines or instructions implemented by the processor 254 to ensure secure communication with and operation of the skid 103. For example, the controller 250 may identify the tool 101 or a user of the tool 101 by requesting an identity (ID). The controller 250 may authenticate the tool 101 or the user by requesting that the tool provide "secret" information that should be known only by the controller 250 (or by a connected server) and the tool 101 or the user. Example secret information includes a password, a PIN, a code, or some other "secret" information that the controller 250 can compare to a known "secret" for the ID. Further, the controller 250 may authorize the tool 101 or the user to perform only certain authorized activities. For example, the ID may be authorized to monitor values of the skid parameters 266, but not to write to the skid parameters 266, to perform control operations, or to download or upload the skid configuration 264. Additionally, the controller 250 may implement access control functions utilizing the whitelisted settings 268. For example, the controller 250 may only allow the tool 101 to fully communicate with the controller 250 if the tool 101 has a particular IP address, a particular MAC address, a particular username or ID, etc. Specifically, the switch 257 may be configured to disable the port to which the tool 101 is connected when an IP address or MAC address of the tool 101 is not included in a set of whitelisted addresses, or may simply not forward traffic (or a subset of traffic) from the tool 101 to the controller 250.

The Skid Configuration 264

The skid configuration 264 is a package of data and instructions for configuring the controller 250, and may be formatted as an XML file or set of files or according to any other suitable format for such data sets. The configuration 264 includes routines (e.g., the routine 262) to be loaded and implemented (e.g., ladder logic, SFC diagrams, etc.) and names, addresses, and initial values for parameters utilized by the routines. The configuration 264 may also include setup parameters for the controller 250, such as a name for the configuration 264, an IP address for the skid 103, and a set of whitelisted networks settings (e.g., IP addresses) that can be utilized to connected to the controller 250.

When the configuration 264 is initially transferred to the skid 103 (e.g., from the tool 101, the supervisor 230, or from another computing device connected to the network 10), the information packaged in the configuration 224 may be extracted and loaded or installed so that the processor 254 can execute the included routines and read from or write to parameters included in the configuration 224. The configuration 264 initially may be stored to long-term storage (e.g., nonvolatile memory). Extracting or loading the packaged information may include transferring at least some of the packaged information to primary storage (e.g., volatile memory) and allocating address space for the included parameters and routines. The routine 262, the parameters 266, and the whitelisted settings 268 may be packaged in the configuration 264. After the configuration 264 is initially received by the controller 250, each of these items may be extracted and stored to the memory 250 in a manner that makes them accessible by the processor 254.

The Skid Parameters 266

The skid parameters 266 may include operational parameters, diagnostic parameters, or configuration parameters. Example operational parameters include process output parameters characterizing the state of the process controlled by the skid 103 (e.g., tank levels, flow rates, material temperatures, etc.) and process input parameters that may be adjusted to affect a change in the controlled process (e.g., causing an actuator to change the state of a valve or pump, which may cause one or more process outputs to change). Example diagnostic parameters include indices representing the health of one or more of the skid parameters 244-248, alarm parameters, communication status parameters indicating whether one or more of the skid parameters 244-248 or the communication interface 256 are communicating as intended, etc. Example configuration parameters include network configuration parameters, signal mapping parameters that map signals to or from the skid components 244-248 to the operational parameters, or graphical displays that may be displayed at a local display (now shown) of the skid 103 to enable monitoring of the skid 103 (e.g., included in the cabinet 152 shown in FIG. 1B).

The Whitelisted Network Settings 268

The set of whitelisted network settings 268 includes network settings that will enable another device to communicate with the controller 250, assuming the device has been configured according to a set of network settings compatible with the whitelisted settings 268. In some cases, the whitelisted settings 268 may be little more than the network settings utilized by the controller 250. Knowing these network settings, another device such as the tool 101 may be configured accordingly (e.g., to ensure the tool 101 is on the same network or subnet as the controller 250). Further, in some cases, the whitelisted settings 268 may specifically identify the particular network settings that should be used by a tool 101 attempting to communicate with the controller 250.

If desired, the whitelisted settings 268 may serve as a reference utilized by the controller 250 to control access by other devices to the controller 250, and in some circumstances may not be available to or accessible by external devices such as the tool 101. In such circumstances, a user of the tool 101 might only be made aware of the specific details of the whitelisted settings 268 by consulting documentation (e.g., digital or paper) stored, e.g., at a database connected to the network 10 or at a filing cabinet in a control room.

In other circumstances, some or all of the whitelisted settings 268 may be made available or accessible to other devices, and the availability may be contingent on one or more security measures. For example, the controller 250 may require the tool 101 to authenticate itself by providing a known name-password pair before accessing the whitelisted settings 268, or may only allow access if a hardware address of the tool 101 (which is generally permanent) matches a hardware address stored in a record of known and authorized addresses maintained by the controller 250 or by a database accessible by the controller 250. In any event, regardless of the accessibility of the whitelisted settings 268 to other devices, a device attempting to fully communicate with the controller 250 generally needs to be configured according to network settings compatible with the whitelisted settings 268.

The controller 250 and the tool 101 may be configured to communicate according to the Internet protocol suite (sometimes referred to as "TCP/IP"), and the whitelisted settings 268 may specify a skid IP address and a subnet mask for the controller 250. Generally speaking, an IP address is a 32-bit number including two components: a network address and a host address. An example IP address is "11000000 10101000 00000001 00000001" in binary, or "192.168.1.1" in decimal. A subnet mask is a 32-bit number (e.g., binary "11111111 11111111 11111111 00000000" or decimal "255.255.255.0") that separates the IP address into the network address and the host address by way of a bitwise AND operation performed on the subnet mask and the IP address. The subnet mask includes a set of continuous "1"s starting from the most significant bit, wherein every "1" indicates that a bit in the corresponding position of the IP address is a part of the network address. The remaining bit each have a value of "0," indicating that a bit in the corresponding position of the IP address is a part of the host address.

With reference to the example IP address and subnet mask described above, after a bitwise AND operation, the resulting network address would be "192.168.1" and the resulting host address would be "1." In total, 256 unique hosts could be part of this subnet, each having a unique IP address in the range of "192.168.1.0" and "192.168.1.255." A device having a subnet different than "192.168.1" would not be able to connect to this subnet without connecting to a networking device, such as a router, that is connected to the subnet and configured with an appropriate IP address for the connecting port (e.g., 192.168.1.x).

Accordingly, the tool 101 may utilize the skid IP address and skid subnet mask to identify the subnet used by the controller 250 and the potential host addresses that can be assigned to the tool 101, enabling the tool 101 to generate or otherwise assign itself an IP address that enables the tool 101 to communicate with the controller 250. For example, if the previously discussed examples are implemented as the skid IP address ("192.168.1.1") and the skid subnet mask ("255.255.255.0"), the tool 101 may be assigned the IP address "192.168.1.x," wherein the "x" represents a wildcard having any value between 0 and 255. If the host address (represented by the "x" in this example) is different than that utilized by the controller 250 (e.g., "1") and every other device connected to the subnet, the tool 101 can establish communication with the controller 250. As noted, the controller 250 may require the tool 101 to perform one or more security measures before the tool 101 is allowed to perform the monitoring, control, and configuration operations previously discussed.

In addition to or instead of the skid IP address and skid subnet mask, the whitelisted settings 268 may specify one or more authorized IP addresses. In such scenarios, the tool 101 may only establish full communication with the controller 250 when its IP address matches one of the authorized IP addresses in the whitelisted settings 268.

The Supervisory System 230

The supervisory system 230 (or supervisor 230) is an electronic device configured to gather data from a controlled process (e.g., measurement data, diagnostic data, etc. from field devices or skids) and to transmit commands to field devices and skids. The supervisor 230 may be similar in nature to the controller 11 shown in FIG. 1A, and may be similarly connected the network 10, the backend 125, and any of the components connected to the network 10.

At a high level, the supervisory 230 may be thought of as a gateway between the larger process control system 5 (and the corresponding high-level control scheme implemented by the system 5) and the skid 103. Because the skid 103 may operate as a self-contained and more or less autonomous process control system, it may not be fully integrated into a larger control scheme for controlling the plant 5 in the same manner that the field devices 15-46 are fully integrated. For example, while a larger control scheme for the plant 5 may include routines specifically configured to directly control the field devices 15-46, the larger control scheme may not directly control the skid 103. Rather, the skid 103 may implement its own specially configured control routine(s), and the larger control scheme for the plant 5 may largely be relegated to monitoring the skid 103 for proper operation. Because the supervisor 230 often is not expected to implement direct control of the skid 103 based on real-time feedback, there may be higher latency in the communications between the skid 103 and the supervisor 230 than that seen in the communications between the controller 11 and the field devices 15-46, for example. In some instances, the larger control scheme may adjust parameters of the skid 103 (e.g., targets for measured outputs, such as temperature, pressure, flow, etc.) without having access to the particular routines 262 of the skid 103, and the routines 262 may then attempt to control the skid 103 in light of the adjusted parameters.

The supervisor 230 may include a set of circuits (not shown) configured to enable the described monitoring and control functions. For example, the system 230 may include a processor, a memory (e.g., storing routines and data configured for the described operations), and a communication interface (e.g., coupling the supervisor 230 to the network 10 and the skid 103). In addition to or instead of software routines, in some instances the supervisor 230 may include customized circuitry configured to implement the described operations.

The Skid Communicator Tool 101

The tool 101 is a portable electronic device configured to wirelessly communicate with the skid 103, enabling the tool 101 to: (i) monitor parameters internal to the skid 103, (ii) adjust values for parameters internal to the skid 103 and transmit commands to the skid 103, (iii) download a skid configuration from the skid 103, (iv) update or configure a skid configuration, and (v) upload a skid configuration from the tool 101 to the skid 103. Unlike many user devices in plant environments, the tool 101 can quickly and seamlessly connect to, disconnect from, and reconnect to any of a number of skids and networks that require different network settings. The tool 101 enables these seamless transitions because it does not require the user to manually find network settings or to manually configure the tool 101 with the network settings every time the tool is transitioning between a first skid (or network) having a first set of whitelisted network settings to a second skid (or network) having a second set of whitelisted network settings.

Traditionally, typical network-enabled devices in plant environments are slow to transition between networks and devices requiring different network settings. As noted, many skids, for example, only enable a device to couple to the skid when the device is configured to have a particular IP address that falls within a small set of whitelisted IP addresses. A device configured to dynamically set its own IP address is unlikely to dynamically set its IP address to one required by the skid. Consequently, typically a user must manually identify the whitelisted IP address or addresses and configure her device to have a static IP address falling within the set of whitelisted IP addresses.

As a result, users often waste time manually looking up network settings and manually configuring their devices to connect to a skid. Alternatively, they may bypass the hassle altogether and simply avoid performing small tasks that require connecting to a skid. As noted, in many cases, each skid in a plant environment requires distinct sets of whitelisted network settings for any device attempting to connect to the skid, and a plant network such as the network 10 may require yet another set of network settings. Configuring the device according to any one of these sets may preclude the device from connecting to other skids or networks. This can be problematic, as the user is forced to manually update the network settings for her device any time she wants to connect to a different network or device. For example, she must first identify the whitelisted network settings for a first skid, which may not be readily accessible. Ideally, whitelisted network settings for a skid are visibly posted on the skid itself, but often times these posted settings are covered or otherwise displaced over time. In some instances, the whitelisted settings are never posted, forcing the user to hunt down plant personnel, manuals and documents, or skid vendors in an attempt to find the whitelisted settings. Even if the whitelisted settings are posted or otherwise made available, someone may update the whitelisted network settings for the skid without updating the posting to reflect the new whitelisted settings.

In any event, assuming the user discovers the whitelisted settings needed to connect to the skid, she then must navigate through a number of menus and prompts on her device to configure her device with network settings corresponding to those whitelisted for the first skid. When she finishes a task or project involving a first skid and wishes to reconnect to a plant network or to a second skid, she again must find and load the whitelisted settings for the plant network or second skid. Each time she wants to transition between skids or between one of the skids and the plant network, she must go through this process again.

Advantageously, the tool 101 can quickly and seamlessly configure and reconfigure itself for any of a number of sets of network settings. Consequently, while the network 10 may require a first set of whitelisted network settings distinct form a second set of whitelisted network settings required by the skid 103, the tool 101 can quickly reconfigure itself according to each of the first and second set of network settings, allowing the tool 101 to quickly alternate between connections to the network 10 and the skid 103. Similarly, the skids 104 and 105 shown in FIG. 1A may require third and fourth sets of distinct whitelisted network settings, and the user may alternative connections between any one or more of the network 10, the skid 103, the skid 104, and the skid 105.

Sticking with FIG. 1A, the tool 101 may include a set of network settings 225 corresponding to the whitelisted settings 268 for the skid 103. The tool 101 may detect a physical connection to the skid 103 (e.g., by sending or receiving discovery messages) or may detect user input representing a desire to connect to the skid 103, and may respond by identifying and loading the network settings 225 associated with the skid 103, enabling the tool 101 to quickly and seamlessly establish communication with the skid 103.

As shown in FIG. 2, the tool 101 may communicate with the skid 103 via the wired link 299, communicate with the supervisor 230 via a wireless link 298, and communicate with the network 10 via a wireless link 295 (e.g., connecting the tool 101 to the wireless gateway 35). As indicated by the dashed lines for the links 295 and 298, in some instances the tool 101 may not be coupled to the network 10 or to the supervisor 230. Any one or more of the links 295, 298, and 299 may be wired or wireless links, depending on the implementation.

The tool 101 includes a processor 204 coupled to each of a memory 202, a communication interface 206, and an input/output (I/O) interface 208. The I/O interface 208 is coupled to one or more user interface (UI) components 210, including a display 211 and a set of input sensors 213. The display 211 may be any suitable display, such as an LCD display, a smart watch display, a headset display (e.g., VR goggles), a projector, a touch display, or some combination thereof. The input sensors 213 may include any desired mechanical or electrical components, such as hardware actuators (e.g., "hard" buttons) or electrical sensors such as resistive or capacitive touch sensors. Such touch sensors may be integrated with the display 211 as a touchscreen. The UI 210 may include speakers for audio output, actuators for providing haptic feedback, etc. The tool 101 may include a power supply 212 configured to supply power to the other components of the tool 101. The memory 202 stores instructions 253 including a skid client 222 and data 205 including a skid configuration 224 and sets of preconfigured network settings 225-229.

The Skid Client 222

Generally speaking, the skid client 222 is a set of routines including: (i) routines or instructions enabling the tool 101 to communicate with the skid 103, and (ii) routines or instructions enabling the tool 101 to implement operations to facilitate monitoring, controlling, and configuring the controller 250 and the skid 103 via the tool 101. The client 222 may take any form, including software, firmware, or hardware. The client 222 may be stored in any desired type of memory 202, such as RAM or ROM. Likewise, the client 222 may be hard-coded into, for example, one or more EPROMs, EEPROMs, application specific integrated circuits (ASICs), or any other hardware or firmware elements.

Regarding routines or instructions for communicating with the skid 103, the skid client 222 may enable the tool 101 to detect a skid ID for the skid 103, identify (e.g., automatically) a set of preconfigured settings linked to the skid ID, and load the set of preconfigured settings to the tool 101 to enable quick and seamless communicative connection to the skid 103. The client 222 may also enable the tool 101 to create or update preconfigured settings for the skid 103 that can be used in the future to enable the tool 101 to automatically or seamlessly communicatively connect to the skid 103. Updating or creating the set of preconfigured settings may involve an automatic configuration process that involves requesting at least a portion of whitelisted network settings from the skid 103. Additional details regarding the tool 101 establishing communication with the skid 103 are described below in section IV with reference to an example method shown in FIG. 3 that may be implemented, in whole or in part, by the client 222 and the tool 101.

Regarding routines or instructions to facilitate monitoring, controlling, and configuring the controller 250 via the tool 101, the skid client 222 may enable to tool 101 to do any one or more of the following, depending on the particular configuration of the tool 101 and the skid 103: (i) monitor parameters internal to the skid 103, (ii) adjust values for parameters internal to the skid 103 and transmit commands to the skid 103, (iii) download a skid configuration from the skid 103, (iv) update or configure a skid configuration, and (v) upload a skid configuration from the tool 101 to the skid 103.

The Skid Configuration 224

The skid configuration 224 is a package of data and instructions for configuring the controller 250, and may be formatted as an XML file or set of files. The configuration 224 includes routines to be loaded and implemented (e.g., ladder logic, SFC diagrams, etc.) by a controller of a skid, as well as names, addresses, and initial values for parameters utilized by the routines. The configuration 224 also includes setup parameters, such as a name for the configuration 224, an IP address for a skid that will receive and implement the configuration 224, or a set of whitelisted networks settings (e.g., IP addresses) that can be utilized to connected to the skid that receives and implements the configuration 224.

To illustrate, the configuration 224 may be transmitted to the skid 103 to configure the skid 103. When the configuration 224 is initially received by the controller 250 of the skid 103, the information packaged in the configuration 224 may be extracted and loaded or installed so that the processor 254 can execute the included routines and read from or write to parameters included in the configuration 224 (the loading or installing may include allocating memory space and addresses of the memory 252 to the included parameters).

The Sets of Preconfigured Network Settings 225-229

Each of the sets of network settings 225-229 may specify a network address according to which the tool 101 should be configured in order to communicate with a skid, network, or device associated with the particular set. The network address may include an IP address and a subnet mask. Each set may also include a parameter indicating whether the tool 101 should have a static or dynamic network address.

Said another way, each set 225-229 corresponds to a particular set of whitelisted settings associated with a particular skid, network or device. For example, the settings 225 may correspond to the skid 103. The settings 226 may correspond to the skid 104; the settings 227 may correspond to the skid 105; the settings 228 may correspond to the network 10; and the settings 229 may correspond to some other device or network.

Example Operations Implemented by a Skid Communicator Tool

FIG. 3 is a flow chart of an example method 300 for quickly configuring a skid communicator tool according to a set of network settings whitelisted by a skid controller, enabling the skid communicator tool to fully communicate with the skid controller. The method 300 may be implemented, in whole or in part, by the skid communicator tool 101 shown in FIG. 2, and may be saved to a memory as one or more instructions or routines. While the method 300 is described with reference to the tool 101, the skid 103, and other components of the plant 5 depicted in FIGS. 1-2, any suitably configured skid communicator tool may implement the method 300 to communicate with any suitably configured skid.

The method 300 begins at a step 301 when a wired link is established between the tool 101 and the skid controller 250 of the skid 103. The step 301 may involve the user physically coupling the skid 103 and controller 250 via any suitable medium utilized for communications, such as by a coaxial cable, twisted pair cable (e.g., Ethernet cable such as CAT 3-CAT 7 cabling), fiber optic cable, USB cable (e.g., conforming to USB 1.x, 2.x, or 3.x standards), FireWire cable, Thunderbolt cable, etc. In some instances, the link may be wireless in nature.

At a step 302, the tool 101 detects a request to communicatively couple the tool 101 to the skid controller 250 via the wired link referenced in the step 301. The tool 101 may automatically detect the request by way of detecting that the skid 103 is linked to another device via the wired link. In other words, the step 302 may be automatic and performed without user intervention.

In some instances, the step 302 includes a manual action involving a user. For example, the input sensors 213 may detect user input representing the request (e.g., detecting touch input, an actuation of a physical button or key such as a mouse key, etc.). In some instances, the tool 101 may implement step 302 before step 301.

At a step 304, the tool 101 determines whether or not communication with the controller 250 is enabled with the current network settings loaded to the tool 101. For example, the tool 101 may be currently configured according to the set of preconfigured network settings 228 for communicating with the network 10. If communication between the tool 101 and the controller 250 is not enabled by the current network settings (e.g., the settings 228 for the network 10), the tool 101 proceeds to a step 306.

On the other hand, if communication between the tool 101 and the controller 250 is enabled by the current network settings, the tool 101 proceeds to a step 332 to establish a communication link with the controller 250 sufficient to enable the tool 101 to perform one or more of the operations described elsewhere relating to the tool 101 monitoring, controlling, or configuring the skid 103. The step 332 is described in more detail further below.

At the step 306, the tool 101 detects a skid ID for the skid 103 or controller 250. The skid ID may be any suitable string or variable type having a value identifying the skid 103 (e.g., "SK103"). The value of the skid ID may be referred as a tag (e.g., a device tag), may be unique to the skid 103 relative to other devices in the plant 5, and may be stored at the database 72b. The skids 104 and 105 may also have unique skid IDs or tags, such as "SK104" and "SK105."

Sticking with the step 306, the tool 101 may automatically discover the skid ID of the skid 103 by messaging the controller 250 and requesting the skid ID. The controller 250 may respond by transmitting the skid ID to the tool 101 or by transmitting unique information that enables the tool 101 to determine the skid ID (e.g., by transmitting a unique value that the tool 101 can utilize to identify a correlated skid ID, stored at the tool 101 or at a database on the network 10 that can be queried by the tool 101). Alternatively, the tool 101 may detect the skid ID by way of a manual operation involving the user. For example, the tool 101 may prompt the user (e.g., via a graphic or message provided via the display 211) to input the skid ID, which the user may provide via the input sensors 213.

At a step 308, after detecting the skid ID, the tool 101 analyzes the memory 252 to identify a set of preconfigured network settings associated with the detected skid ID. Specifically, the tool 101 may analyze one or more stored sets of preconfigured settings 225-229. In some instances, the tool 101 may interact with a server (e.g., via the network 10) to identify a set of preconfigured network settings associate with the skid ID. For example, the tool 101 may transmit the skid ID to a server coupled to the network 10 along with a request for a set of corresponding network settings. The server may respond by analyzing a record of stored preconfigured network settings to determine if any of the stored settings are associated with the received skid ID. If an appropriate set of preconfigured network settings is found by the server, the server may transmit the settings to the tool 101. Otherwise, the server may transmit to the tool 101 notifying the server that no preconfigured network settings exist for the given skid ID.

At a step 310, the tool 101 either (i) fails to identify a set of preconfigured settings associated with the skid ID and proceeds to a step 312 to begin a configuration process (described in more detail below) or (ii) identifies a set of preconfigured settings associated with the skid ID and proceeds to a step 329 or a step 330 to load the preconfigured settings. Regarding the first scenario, for example, the tool 101 may determine that none of the preconfigured settings 225-229 is associated with the skid ID "SK103," and may proceed to the step 312 described in more detail below.

As for the second scenario referenced regarding step 310, to illustrate, the tool 101 may determine that the set of network settings 225 is associated with the skid ID "SK103" and may proceed to the step 329 or directly to the step 330 (as indicated by the dashed line). The tool 101 may proceed directly to the step 330 when it is configured to automatically detect and load preconfigured settings for a given skid (e.g., shortly after the user connects the tool 101 to the controller 250).

Figure 4:
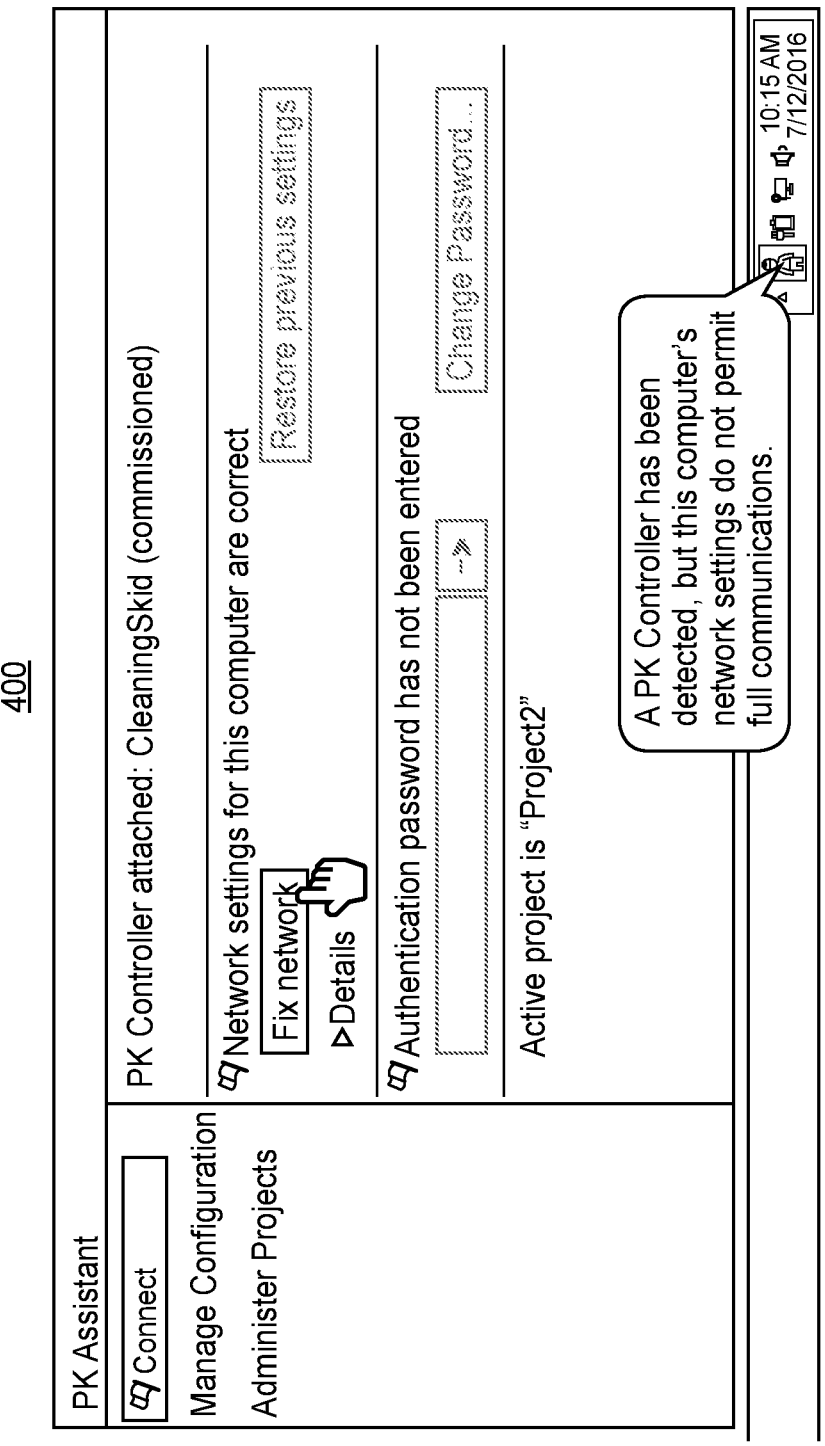
FIG. 4 depicts an example display that may be provided by the skid communicator tool shown in FIGS. 1A and 2 to prompt a user to confirm that she wants to configure the skid communicator tools according to a set of preconfigured network settings.

At the step 329, the tool 101 detects a user's request or verification that he or she wants to load the preconfigured settings. To illustrate, FIG. 4 depicts an example display 400 of a GUI that may be provided at the display 211 of the tool 101. The user may actuate (e.g., click) the button labeled "Fix network" to provide the request that is detected by the skid 103. Note, the display 400 requires little knowledge from the user regarding particular network settings or names for the skid 103. He or she simply clicks a button to load the appropriate settings and quickly establish communication with the skid 103. The button or graphic element that a user may interact with to provide the request may have any suitable label. For example, a name or skid ID for the skid 103 may be displayed. After the step 329, the tool implements the step 330.

At the step 330, the tool 101 configures its network settings according to the set 225. For example, the tool 101 may set IP address settings and subnet mask settings according to an IP address and a subnet mask specified by the settings 225 (e.g., 192.168.1.3 and 255.255.255.0). As noted, the tool 101 may implement this step directly after the step 310 to enable quick and automatic network configuration of the tool 101 without user input. The tool 101 then may proceed to the step 304.

In the step 304 in this second scenario, the tool 101 may verify that full communication between the tool 101 and the controller 250 is enabled when the tool 101 is configured according to the set 225. Assuming the loaded set 225 enables communication, the tool 101 proceeds to the step 332 and establishes a communication link with the controller 250. But, if the loaded set 225 does not enable communication, the loaded set 225 apparently does not conform to the whitelisted settings 268 utilized by the controller 250. Accordingly, the tool 101 may return to the step 304 to again attempt to detect a skid ID (e.g., in case the originally detected skid ID was incorrect for some reason). Note, because the whitelisted settings 268 may have changed since the set 225 was last created or updated and stored to the memory 202 of the tool 101, the tool 101 may proceed to the step 312 to setup or configure a new set of preconfigured settings for the controller 250 and the skid 103 (e.g., by updating the set 225). In any event, if one or more of the steps 301-310, 329 and 330 do not result in the tool 101 identifying and loading a set of preconfigured settings associated with the skid ID that enable the tool 101 to fully communicate with the controller 250, the tool 101 proceeds to the step 312.

At the step 312, if automatic configuration is not enabled for the tool 101, the tool 101 may proceed to a step 314 to begin a manual configuration operation. If automatic configuration is enabled, the tool 101 may proceed to a step 320. The tool 101 may determine whether or not automatic configuration is enabled based on a value of a variable stored to the memory 252. Alternatively or additionally, the tool 101 may prompt the user, requesting the user input a command indicating whether he or she will proceed with a manual configuration or an automatic configuration. This input may be as simple as hitting a graphic button labeled "Automatically configure network settings," or something similar.

At the step 314, a manual configuration procedure may be initiated (e.g., when automatic configuration is not enabled or is otherwise not activated). The manual configuration may include two steps or sub-steps: a step 316 and a step 318. At the step 316, the tool 101 prompts the user to input a set of network settings that can be loaded to the tool 101 to enable the tool 101 to communicate with the skid 103. The prompt may include a text or number field, and may request that the user enter an IP address for the tool 101 or a subnet mask for the tool 101 that will enable the tool 101 to communicate with the skid 103. At the step 318, the tool 101 receives the provided network settings (e.g., via the text or number field) and proceeds to a step 328, which is described in more detail below. As noted, in some instances the tool 101 performs an automatic configuration procedure at step 320 instead of the manual configuration procedure at step 314.

At the step 320, the tool 101 performs an automatic configuration procedure (e.g., when automatic configuration is enabled and activated). The automatic configuration may include three steps or sub-steps: a step 322, a step 324, and a step 326.

At the step 322, the tool 101 transmits a message to the controller 250 including a request for information that will enable the tool 101 to identify network settings that can be loaded to the tool 101 to enable the tool 101 to fully communicate with the controller 250.

At the step 324, the tool 101 performs one or more security operations if necessary. For example, the tool 101 may identify itself by transmitting to the controller 250 an identity or "ID" (e.g., a MAC address of the tool 101, an IP address of the tool 101, a username for the tool 101 or a user of the tool 101, or any other unique or relatively unique information linked to the tool 101 or the user). In some circumstances, the tool 101 may facilitate authentication of itself by transmitting to the controller 250 secret information linked to the ID (e.g., a password). If desired, the tool 101 may encrypt messages transmitted to the controller 250 and may decrypt messages received from the controller 250. Note, if desired, step 324 may be performed at any time, and may be repeated when desired. For example, the tool 101 may perform step 324 prior to or after the step 332 to the extent the controller 250 requires various security measures be satisfied before giving the tool 101 certain monitoring, control, or configuration permissions. In some instances, the tool 101 does not perform the step 324. In any event, the tool 101 may proceed to the step 326 after steps 322 or 324.

At the step 326, the tool 101 receives network setting information from the controller 250. The received information may include the whitelisted settings 268, or a portion of the whitelisted settings 268. In some instances, the received information includes the particular network settings that will enable communication. In other instances, the received information includes information that enables the tool 101 to generate or otherwise identify the particular network settings that will enable communication. In any event, after the step 326, the tool 101 implements the step 328.

At the step 328, the tool 101 analyzes the settings information received at the steps 318 or 326 to (i) identify preconfigured settings that can be loaded to the tool 101 to enable it to communicate with the controller 250, and (ii) store the preconfigured settings to the memory 202 so that they are referenceable by the skid ID (e.g., "SKD103). As noted, in some instances the received information includes the particular network settings that will be saved as the set of preconfigured network settings for the skid 103 (e.g., the set 225). For example, the tool 101 may analyze the received information may to identify within the received information any one or more of the following, depending on the embodiment: (i) a particular IP address and a particular subnet mask according to which the tool 101 should be configured; (ii) a range of potential IP addresses that can be utilized by the tool 101; (iii) a skid IP address and a skid subnet mask utilized by the controller 250, which the tool 101 may analyze to generate an IP address for the tool 101; (iv) a token that the tool 101 can utilize to, e.g., query a database for the appropriate IP address. In any event, after the tool 101 identifies a set of preconfigured network settings (e.g., an IP address, a subnet mask, a static/dynamic indicator, or some combination thereof) that will enable the tool 101 to communicate with the controller 250, the tool 101 stores the set of preconfigured network settings to the memory 202 (e.g., as the set 225). For example, the tool 101 may store the set 225, which may include an IP address (e.g., 192.168.1.3), a subnet mask (e.g., 255.255.255.255), a static/dynamic indicator (e.g., "static"), and a skid ID parameter having a value correlated with the associated skid (e.g., "SK103"). After the step 328, the tool implements a step 329.

At the step 329, the tool 101 may detect a request to load the preconfigured settings. As already noted, in some instances the step 329 is not implemented, and the tool 101 may proceed directly from the step 328 to the step 330.

At the step 330, the tool 101 loads the set of preconfigured settings stored to memory (e.g., the set 225). The tool 101 then implements the step 304. When implementing the step 304 after the steps 330 and 328, the tool 101 either (i) implement steps 306-328 if the preconfigured settings (e.g., the set 225) do not enable the tool 101 to communicate with the controller 250, or (ii) implements step 332 if the preconfigured settings enable communication between the tool 101 and controller 250. Regarding the former, steps 306-328 may be necessary, for example, if the user provided the tool 101 with incorrect settings during manual configuration (the step 314). In any event, if the preconfigured settings enable the tool 101 to communicate with the controller 250, the tool 101 implements step 332.

At the step 332, the tool 101 establishes a communication link (e.g., the link 299) with the controller 250. The communications via the link 299 generally conform to the TCP/IP protocol, but may conform to any additional or alternative desired protocol or standard (e.g., USB, Bluetooth, NFC, Wi-Fi, MODBUS/TCP, EtherNet/IP, HTTP, BootP, DHCP, DNS, SNTP, FTP, SNMP, SMTP, etc.).

After establishing the communication, the tool 101 may perform any suitable: (i) monitoring or control operations, (ii) read or write operations (e.g., reading or writing to values of the skid parameters 266), or (iii) configuration operations. Regarding configuration operations, the tool 101 may download the skid configuration 264 from the controller 250. The tool 101 may store the configuration 264 to the memory 202 if desired, and may update or change the configuration 264 (e.g., based on user input detected at the sensors 213) by adding, deleting, or adjusting routines or parameters in the configuration 264. The skid configuration 224 stored to the memory 202 shown in FIG. 2 may represent an updated version of the configuration 264, or may represent a distinct configuration. In any event, the tool 101 may upload the updated configuration 264 or the configuration 224 to the controller 250 and cause the controller 250 to load the configuration 224, causing the controller 250 to operate in accordance with the routines or parameters included in the updated configuration 264 or the configuration 224.

When the user is done interacting with the skid 103, she may again quickly change settings of the tool 101 to communicate with the network 10, one of the skids 104 or 105, or another device. For example, the user may connect the tool 101 to a new skid, causing the tool 101 to return to step 301.

Figure 5:
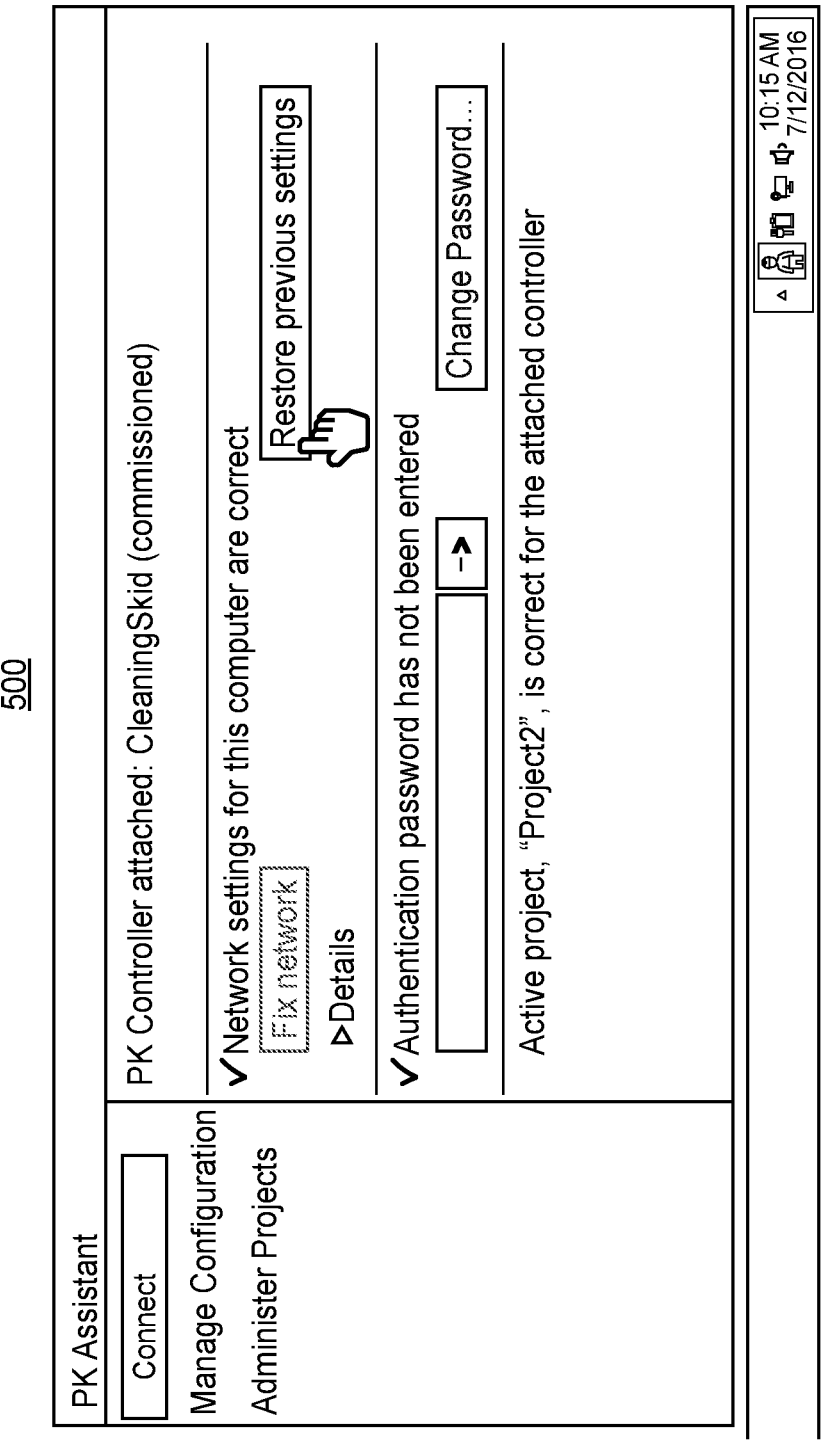
FIG. 5 depicts an example display that may be provided by the skid communicator tool shown in FIGS. 1A and 2 to enable a user to request that previous network settings be restore.

As another example, when the user is done interacting with the skid 103, the user may request to change the network settings without establishing a wired connecting to another skid. For example, he or she may request that tool 101 revert to the previous network settings (e.g., for the network 10) used before the current network settings. To illustrate, FIG. 5 depicts an example display 500 of a GUI that may be provided at the display 211. The user may actuate the button labeled "restore previous settings" to simply restore the settings that were loaded prior to the currently loaded settings (e.g., the set 225). The previous settings may be stored to the memory 202 (e.g., when the tool 101 loads a new set of network settings). After loading the previous settings, the tool 101 may proceed to the step 304 to verify communication is enabled with the network 10 (or whichever skid, network, or device is associated with the previous settings).

Alternatively or additionally, the display 500 may include interactive elements (e.g., buttons, dropdown menus, etc.) particular to each set of saved preconfigured settings 225-229 (and thus particular to each skid, network, or device for which the tool 101 has preconfigured settings). In some instances, the tool 101 may display a search box, enabling the user to search for a tag associated with a skid or network (e.g., "SK103"). In any event, when the user interacts with a graphic element corresponding to one of the sets of preconfigured network settings 225-229, the tool 101 loads the corresponding set 225-229 and proceeds to the step 304. If the loaded set does not work, the tool 101 may again proceed to the step 306.

Note, in some circumstances the method 300 may include alternative or additional operations. For example, in addition to or instead of step 301, the tool 101 may attempt to establish a wireless link to the skid controller 250. In such an embodiment, the tool 101 may fail to establish the wireless link and may proceed to the step 306 of the method 300 in response to this failure and in response to determining that a user wants to communicatively couple the tool 101 to the controller 250. In some instances, the tool 101 may establish a wireless link with limited communication capabilities. The limited wireless link may enable only certain types of messaging between the tool 101 and the controller 250 if desired (e.g., those relating to device/network identification, device/network discovery, authentication operations, and other security measures). This enablement of only certain types of messaging may be desirable even, for example, when the tool 101 is configured according to network settings conforming with the whitelisted network settings at the skid 103. In such instances, the tool 101 may perform one or more of the security operations discussed with reference to the step 324 before proceeding to the step 304 or the step 332.

Additional Considerations

Although this detailed description contemplates various embodiments, it should be understood that the legal scope of any claimed system or method is defined by the words of the claims set forth at the end of this patent. This detailed description is to be construed as exemplary only and does not describe every possible embodiment, as describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Throughout this specification, some of the following terms are used.

Communication Interface. Some of the described devices or systems include a "communication interface" (sometimes referred to as a "network interface"). For example, the tool 101 and the controller 250 of the skid 103 shown in FIG. 2 each include a communication interface. The described communication interfaces enable the system of which they are a part to send information or data to other system or receive information/data from other systems. In some instances, the communication interfaces enable the establishment of a direct link to another system (e.g., between the tool 101 and the skid 103). In some instances, the communication interfaces enable connection via a link to a network (e.g., a personal area network (PAN), a local area network (LAN), or a wide area network (WAN)), such as the network 10.

If desired, the described communication interfaces may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. The described communication interfaces and systems may conform to any one or more suitable communications protocols, standards, or technologies, such as those described herein.

Communications Protocols, Standards, and Technologies. Example communication protocols, standards, or technologies that may be utilized by the described systems include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards include typical radio-frequency identification ("RFID") standards or protocols and near-field communication ("NFC") protocols or standards. Example PAN protocols and standards include 6LoWPAN, Bluetooth (i.e., a wireless standard for exchanging data between two devices using radio waves in the range of approximately 2.4 to 2.485 GHz), IEEE 802.15.4-2006, ZigBee, the Thread protocol, ultra-wideband ("UWB"), universal serial bus ("USB") and wireless USB, ZigBee, and ANT+. Example LAN protocols and standards include the 802.11 protocol and other high frequency protocols/systems for wireless communication in bands found in a range of approximately 1 GHz-60 GHz (e.g., including the 900 MHz, 2.4 GHz, 3.6 GHz, 5 GHz, or 60 GHz bands), as well as standards for suitable cabling such as coaxial and fiber-optic cabling. Example technologies used to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNTP"), secure shell protocol ("SSH"), and any other communications protocol or standard, or any combination thereof.

Communication Link. A "communication link" or "link" is a pathway or medium connecting two or more nodes. A link may be a physical link or a logical link. A physical link is the interface or medium(s) over which information is transferred, and may be wired or wireless in nature. Example wired links include: (i) a cable with a conductor (e.g., copper) for transmission of electrical energy, such as a coaxial cable or twisted pair cable (e.g., Ethernet cable such as CAT 3-CAT 7 cabling); and (ii) a fiber optic cable or connection for transmission of light (e.g., typically utilizing glass as the transmission medium).

A wireless link may be a wireless electromagnetic signal that carries information via changes made to one or more properties of an electromagnetic wave(s). A wireless electromagnetic signal may be a microwave or radio wave and may be referred to as a radio frequency or "RF" signal. Unless otherwise stated, described RF signals may oscillated at a frequency within any one or more bands found in the spectrum of roughly 30 kHz to 3,000 GHz (e.g., an 802.11 signal in the 2.4 GHz band). Example RF bands include the low frequency ("LF") band at 30-300 kHz, the medium frequency ("MF") band at 300-3,000 kHz, the high frequency ("HF") band at 3-30 MHz, the very high frequency ("VHF") band at 30-300 MHz, the ultra-high frequency ("UHF") band at 300-3,000 MHz, the super high frequency ("SHF") band at 3-30 GHz, the extremely high frequency ("SHF") band at 30-300 GHz, and the tremendously high frequency ("THF") band at 300-3,000 GHz.

In some instances, a wireless electromagnetic signal may be a light signal oscillating at a frequency of roughly 300 GHz to 30 PHz with wavelengths of roughly 100 nm to 1 mm, which may be: (i) an ultraviolet light ("UV") signal having a wavelength roughly in the range of 10 nm-400 nm and a frequency roughly in the range of 750 THz-30 PHz; (ii) a visible light signal having a wavelength roughly in the range of 400 nm-700 nm and a frequency roughly in the range of 430 THz-750 THz, or (iii) an infrared ("IR") signal having a wavelength roughly in the range of 700 nm-1 mm and a frequency roughly in the range of 300 GHz-430 THz. Unless otherwise stated, described light signals may conform to any suitable light signal protocol or standard, such as visible light communication (VLC) standards, light fidelity (Li-Fi) standards, Infrared Data Association (IrDA) standards, IrSimple standards, etc.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

A network may include dedicated routers, switches, or hubs responsible for forwarding or directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine" or "application" described in this disclosure refers to a set of computer-readable instructions that may be stored on a CRM. Generally, the CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource. The call may be (i) a "function call" that is invoked to cause execution of a resource (e.g., set of instructions) stored at a library accessible by the software program; (ii) a "system call" that is invoked to cause execution of a system resource (e.g., often running in privileged kernel space and only executable only by the operating system); (iii) a "remote call" that is invoked to cause a logical or physical entity with a different address space to execute a resource; or (iv) some combination thereof. As an example, a routine executed by a processor of a device may invoke a "remote call" to cause execution of a resource at (i) a second device (e.g., a server host, an end-user device, a networking device, a peripheral device in communication with the device, or some other physical device); (ii) a virtual-machine on the same or different device; (iii) a processor (e.g., CPU or GPU) that is different from the original processor and that may be internal or external to the device executing the routine; or (iv) some combination thereof.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

User Interface (UI). Generally speaking, a user interface refers to the components of a computer system by which a user and the computer system interact. The UI components may be hardware, software, or some combination thereof, and may include UI input components, UI output components, or some combination thereof.

Example UI output components include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Example UI input components include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Some systems provide a graphical user interface (GUI) by way of a UI output component such as an electronic display. Generally speaking, a GUI is generated via a routine and enables a user to interact with indicators and other graphic elements displayed on at the electronic display. Generally speaking, the graphic elements of a GUI may be GUI output elements (i.e., conveying some sort of information to the user), GUI control elements (i.e., being user "interactable" to cause the execution of an action by the system), or both (e.g., an icon may include an image representing a browser and may be interacted with to launch the browser).

Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

Generally speaking, a window is an area on the screen that displays information, with its contents being displayed independently from the rest of the screen. Generally, a menu is a list of selectable choices that a user may select to execute a corresponding command (e.g., to cause the menu to expand and display additional choices, to cause a new window to be generated, etc.). Generally, an icon is small image representing an object such as a file, an application, a web page, or a command. A user can typically interact with an icon (e.g., by single or double pressing or clicking) to execute a command, open a document, or run an application.

What is claimed:

1. A skid communicator tool for communicating with skid controllers in process control environments, the skid communicator tool comprising:
a communication interface configured according to a set of initial network settings;
one or more processors coupled to the communication interface and configured to:
(i) detect a wired link between the communication interface and a skid controller for a skid in a process control environment;
(ii) detect that the set of initial network settings does not enable a communication channel between the skid communicator tool and the skid controller by way of the wired link;
(iii) perform an analysis of a plurality of sets of preconfigured network settings to identify a particular set of preconfigured network settings associated with the skid controller; and
(iv) when the particular set of preconfigured network settings is identified by way of the analysis:
(a) automatically configure the communication interface according to the particular set of preconfigured network settings to establish the communication channel via the wired link; and
(b) control, monitor, or configure operation of the skid by transmitting or receiving skid data via the communication channel.

2. The skid communicator tool of claim 1,
wherein the skid communicator tool further includes a user interface coupled to the one or more processors;
wherein the one or more processors are further configured to detect, via the user interface, a request to enable the communication channel; and
wherein the one or more processors automatically configure the communication interface in response to detecting the request.

3. The skid communicator tool of claim 2,
wherein the one or more processors are further configured to: respond to detecting that the set of initial network settings do not enable the communication channel by generating a notification, provided at the user interface, indicating that the set of initial network settings do not enable the communication channel;
wherein the notification is generated and provided before the one or more processors detect the request to enable the communication channel.

4. The skid communicator tool of claim 1, wherein transmitting or receiving the skid data via the communication channel comprises:
receiving, from the skid controller, a value read from a skid parameter; or
transmitting, to the skid controller, a value to be written to a skid parameter.

5. The skid communicator tool of claim 1,
wherein the skid data comprises a skid configuration including one or more skid routines and one or more skid parameters; and
wherein transmitting or receiving the skid data via the communication channel comprises:
(A) (i) downloading the skid configuration from the skid controller; or
(ii) uploading the skid configuration to the skid controller.

6. The skid communicator tool of claim 5, wherein the skid communicator tool further includes a user interface coupled to the one or more processors; and wherein the one or more processors are further configured to:
display, via the user interface, a graphical user interface (GUI) for editing skid configurations;
receive, via the GUI, a request to adjust a value of the one or more routines or of the one or more parameters in the skid configuration;

update the skid configuration according to the request; and upload the updated skid configuration to the skid controller.

7. The skid communicator tool of claim 1, wherein the one or more processors are configured to perform the analysis of the plurality of sets of preconfigured network settings to identify the particular set of preconfigured network settings by:

identifying the particular set of preconfigured network settings, from the plurality of sets of preconfigured network settings, based on the particular set of preconfigured network settings being correlated to a value of a skid ID for the skid controller.

8. The skid communicator tool of claim 7, wherein the one or more processors are further configured to detect the value of the skid ID via the communication interface by transmitting to the skid controller a message requesting the value of the skid ID; and receiving from the skid controller the value of the skid ID.

9. The skid communicator tool of claim 7, wherein the one or more processors are configured to detect the value of the skid ID via a user interface coupled to the one or more processors by: detecting user input, at the user interface coupled to the one or more processors, indicating the value of the skid ID.

10. The skid communicator tool of claim 1, wherein the particular set of preconfigured network settings comprise:
an Internet Protocol (IP) address; and
a subnet mask.

11. The skid communicator tool of claim 1, wherein the one or more processors are further configured to:

prior to automatically configuring the communication interface according to the set of preconfigured network settings: store the set of initial network settings to memory; and after controlling, monitoring, or configuring operation of the skid: (i) receive, via a user interface coupled to the one or more processors, a request to restore previous network settings for the skid communicator tool; and (ii) in response to receiving the request to restore, automatically configure the communication interface according to the set of initial network settings stored to memory.

12. The skid communicator tool of claim 1,
wherein the skid is a first skid and the skid controller is a first skid controller;
wherein the particular set of preconfigured network settings is a first set in the plurality of sets of preconfigured network settings; and
wherein the plurality of sets of preconfigured network settings further includes:
(i) a second set of preconfigured network settings correlated to a second skid controller for a second skid; and
(ii) a third set of preconfigured network settings correlated to a plant network in the process control environment.

13. The skid communicator tool of claim 1, wherein the one or more processors are further configured to:
when the particular set of preconfigured network settings is not identified by way of the analysis, generate the particular set of preconfigured network settings by:
(i) displaying, at the user interface, a prompt requesting a user provide network settings for the skid controller;

(iii) receiving, via the user interface, a set of user-provided network settings; and
(iv) storing the user-provided network settings to memory as the particular set of preconfigured network settings.

14. The skid communicator tool of claim 1, wherein the one or more processors are further configured to:
when the particular set of preconfigured network settings is not identified by way of the analysis, generate the particular set of preconfigured network settings by:
(i) transmitting to the skid controller, via the communication interface, a request for a set of network settings conforming to a set of whitelisted network settings maintained by the skid controller;
(ii) receiving, via the communication interface, a set of skid-provided network settings; and
(iii) storing the skid-provided network settings to memory as the particular set of preconfigured network settings.

15. The skid communicator tool of claim 14,
wherein the one or more processors are further configured to transmit, to the skid controller, information enabling the skid controller to identify or authenticate the skid communicator tool; and
wherein the skid controller is configured to transmit the skid-provided network settings after identifying or authenticating the skid communicator tool based on the information.

16. A method for quickly connecting to skid controllers and downloading skid configurations, the method comprising:

detecting, by a skid communicator tool, a wired link between the skid communicator tool and a skid controller for a skid in a process control environment;

detecting, by the skid communicator tool, that a set of initial network settings according to which the skid communicator tool is configured does not enable a communication channel between the skid communicator tool and the skid controller by way of the wired link;

analyzing a plurality of sets of preconfigured network settings to identify a particular set of preconfigured network settings associated with the skid controller; and when the particular set of preconfigured network settings is identified by way of the analyzing:

(a) automatically configuring, by the skid communicator tool, the skid communicator tool according to the particular set of preconfigured network settings to enable the skid communicator tool to establish the communication channel via the wired link; and (b) controlling, monitoring, or configuring operation of the skid by transmitting or receiving skid data via the communication channel.

17. The method of claim 16, further comprising:
detecting, by the skid communicator tool, a request to enable the communication channel; and
wherein when the particular set of preconfigured network settings is identified, said automatically configuring occurs in response in response to the skid communicator tool detecting the request to enable the communication channel.

18. The method of claim 17, further comprising:
responding to said detecting that the set of initial network settings do not enable the communication channel by:
generating a notification, provided at a user interface of the skid communicator tool, indicating that the set of initial network settings do not enable the communication channel;
wherein the detected request to enable the communication channel is provided via the user interface in response to the prompt.

19. The method of claim 16, wherein transmitting or receiving the skid data via the communication channel comprises:
   receiving, from the skid controller, a value read from a skid parameter; or
   transmitting, to the skid controller, a value to be written to a skid parameter.

20. The method of claim 16,
   wherein the skid data comprises a skid configuration including one or more skid routines and one or more skid parameters; and
   wherein transmitting or receiving the skid data via the communication channel comprises:
      (B) (i) downloading the skid configuration from the skid controller;
      (ii) uploading the skid configuration to the skid controller.

21. The method of claim 20, further comprising:
   displaying, by the skid communicator tool, a graphical user interface (GUI) for editing skid configurations;
   receiving, via the skid communicator tool, a request to adjust a value of the one or more routines or of the one or more parameters in the skid configuration;
   updating the skid configuration according to the request; and
   uploading the updated skid configuration to the skid controller.

22. The method of claim 16, wherein analyzing the plurality of sets of preconfigured network settings to identify the particular set of preconfigured network settings comprises:
   identifying the particular set of preconfigured network settings, from the plurality of sets of preconfigured network settings, based on the set of preconfigured network settings being correlated to a value of a skid ID for the skid controller.

23. The method of claim 16, wherein the particular set of preconfigured network settings comprise:
   an Internet Protocol (IP) address;
   a subnet mask; and
   a setting indicating that the IP address is static.

24. The method of claim 16, further comprising:
   prior to automatically configuring the communication interface according to the set of preconfigured network settings: storing the set of initial network settings to memory;
   after controlling, monitoring, or configuring operation of the skid: (i) receiving, via the skid communicator tool, a request to restore previous network settings for the skid communicator tool; and (ii) in response to receiving the request to restore, automatically configuring the skid communicator tool according to the set of initial network settings stored to memory.

25. The method of claim 16,
   wherein the skid is a first skid and the skid controller is a first skid controller;
   wherein the particular set of preconfigured network settings is a first set in the plurality of sets of preconfigured network settings; and
   wherein the plurality of sets of preconfigured network settings further includes:
      (i) a second set of preconfigured network settings correlated to a second skid controller for a second skid; and
      (ii) a third set of preconfigured network settings correlated to a plant network in the process control environment.

26. The method of claim 16, further comprising:
   when the particular set of preconfigured network settings is not identified by way of the analyzing, generating the particular set of preconfigured network settings by:
      (i) displaying, at the skid communicator tool, a prompt requesting a user provide network settings for the skid controller;
      (iii) receiving, via the skid communicator tool, a set of user-provided network settings; and
      (iv) storing the user-provided network settings to memory as the particular set of preconfigured network settings.

27. The method of claim 16, further comprising:
   when the particular set of preconfigured network settings is not identified by way of the analyzing, generating the particular set of preconfigured network settings by:
      (i) transmitting to the skid controller, via the communication interface, a request for a set of network settings conforming to a set of whitelisted network settings maintained by the skid controller;
      (ii) receiving, via the communication interface, a set of skid-provided network settings; and
      (iii) storing the skid-provided network settings to memory as the particular set of preconfigured network settings.

28. The method of claim 27, further comprising:
   transmitting, to the skid controller, information enabling the skid controller to identify or authenticate the skid communicator tool; and
   wherein the skid controller is configured to transmit the skid-provided network settings only after identifying or authenticating the skid communicator tool based on the information.

* * * * *